US008577626B2

(12) United States Patent
Gupta et al.

(10) Patent No.: US 8,577,626 B2
(45) Date of Patent: Nov. 5, 2013

(54) SYSTEM AND METHOD FOR ASSESSING FLUID DYNAMICS

(75) Inventors: Jitendra Kumar Gupta, Pradesh (IN); Muralidharan Lakshmipathy, Karnataka (IN); Yatin Tayalia, Karnataka (IN)

(73) Assignee: General Electric Company, Niskayuna, NY (US)

( * ) Notice: Subject to any disclaimer, the term of this patent is extended or adjusted under 35 U.S.C. 154(b) by 194 days.

(21) Appl. No.: 12/220,168

(22) Filed: Jul. 22, 2008

(65) Prior Publication Data

US 2010/0023276 A1 Jan. 28, 2010

(51) Int. Cl.
*G06F 19/00* (2011.01)

(52) U.S. Cl.
USPC .................. 702/34; 702/182; 73/866.5; 73/9; 73/12; 324/220; 324/228; 324/238; 166/250.1; 166/66

(58) Field of Classification Search
USPC ............ 702/34, 42, 182; 703/9, 12; 73/866.5, 73/152.28, 61.41, 865.8; 324/220, 228, 324/238; 166/250.11, 66; 175/40
See application file for complete search history.

(56) References Cited

U.S. PATENT DOCUMENTS 4,076,281 A * 2/1978 Davis .............................. 285/64
5,939,688 A * 8/1999 Hutchinson .............. 200/81.9 R
6,418,806 B1 * 7/2002 Mullender et al. ........... 73/866.4
6,935,425 B2 * 8/2005 Aronstam ................ 166/250.11
7,414,395 B2 * 8/2008 Gao et al. ...................... 324/220
7,691,266 B2 * 4/2010 Fendya et al. ........... 210/321.76
7,991,488 B2 * 8/2011 Viele ............................... 700/29
8,214,133 B2 * 7/2012 Viele ............................. 701/106
2003/0171879 A1 * 9/2003 Pittalwala et al. .............. 702/34
2004/0031337 A1 * 2/2004 Masaniello et al. ......... 73/865.8
2005/0103123 A1 * 5/2005 Newman .................. 73/862.045
2005/0223825 A1 * 10/2005 Janssen ........................ 73/865.8
2008/0147367 A1 * 6/2008 Massingill et al. ............. 703/10
2008/0243401 A1 * 10/2008 Viele ............................... 702/50
2008/0257782 A1 * 10/2008 Vachhani et al. ............... 208/47
2010/0299122 A1 * 11/2010 Golinveaux et al. .............. 703/9
2012/0016564 A1 * 1/2012 Viele ............................. 701/102
2012/0245829 A1 * 9/2012 Viele ............................. 701/106

FOREIGN PATENT DOCUMENTS

CN 201050657 Y 4/2008

OTHER PUBLICATIONS

Bird, Byron R., et al., "Velocity distributions in turbulent flow", Transport Phenomena, 153-179 (1960), John Wiley & sons. Inc., New York, US.
Written Opinion of the International Issued on Oct. 27, 2009 for PCT/US2009/046575.
GE RCM Allows Refinery to Precisely Measure Pipe Corrosion when Processing High Acid Opportunity Crudes; Water & Process Technologies; 2007, pp. 1-3; General Electric Company.

* cited by examiner

*Primary Examiner* — Carol S Tsai
(74) *Attorney, Agent, or Firm* — Fletcher Yoder, P.C.

(57) ABSTRACT

Methods and systems for assessing fluid dynamics aspects of corrosion and shear stress in piping networks are provided. Shear stress hot spots of a piping network may be identified using non-dimensional transfer functions that have been developed for identifying the magnitude and location of these local maxima depending upon the geometrical parameters of commonly used components of piping networks, the fluid properties of the flow, and the operating conditions of the piping network. Upon identification of potential shear stress local maxima, piping network operators may monitor these locations for corrosion or other damage to prevent loss of integrity of the pipes.

15 Claims, 39 Drawing Sheets
(18 of 39 Drawing Sheet(s) Filed in Color)

SYSTEM AND METHOD FOR ASSESSING FLUID DYNAMICS

BACKGROUND

The invention relates generally to methods and systems for determining placement of corrosion monitors along piping networks for detecting and monitoring loss of material due to corrosion.

Oil and gas piping networks may be susceptible to corrosion over time. For example, acidic and mineral-laden crude oil is highly corrosive to metals. In extreme cases, a pipe segment may corrode to the point of leaking. Because such leakages may interfere with efficient operation of piping networks, corrosion in pipelines is typically monitored.

Corrosion sensors and/or monitors are used in the detection and monitoring of loss of material, such as the internal surface of a pipeline wall, due to corrosion and/or erosion from interaction between the material and the environment in contact with the material. Some types of corrosion monitors use electrical resistance methods to detect loss of material thickness in the pipe wall due to corrosion. Other types of monitoring methods may involve X-ray or ultrasound evaluation of the thickness of pipe walls. Typically, the monitoring takes place at multiple, discrete locations along a pipe network because the large scale of such networks inhibits global monitoring of corrosion.

However, there is no standard for the selection of the individual monitoring sites along the piping networks. For handheld-type monitors, corrosion is monitored at locations selected by the operator of the device. Generally, these locations are determined by operator intuition. Certain types of electrical resistance corrosion monitors are permanently mounted to individual locations on the pipe. As with the handheld devices, there are no guidelines to determine optimal placement of such monitors.

BRIEF DESCRIPTION

In certain embodiments, provided herein are methods and systems for prediction of localized fluid dynamics parameters in piping networks for fluids under turbulent flow conditions. Predicting fluid dynamics parameters using correlation of the fluid behavior in the pipe with shear stress hot spots may assist refinery or other pipeline operators in identifying local maximum shear stress spots. For example, embodiments of the disclosed embodiments may be applied to refineries that include piping networks for crude oil and its fractionates.

In one embodiment, the disclosed embodiments provide a method that includes receiving information about a piping network for fluids, wherein the information comprises geometrical parameters, operating condition parameters, and fluid properties for the piping network; correlating the fluid dynamics of the piping network with shear stress using non-dimensional transfer-functions; and determining a location of one or more local shear stress maxima based on the correlation.

In another embodiment, the disclosed embodiments provide a method that includes receiving information about a piping network for fluids, wherein the information comprises geometrical parameters, operating condition parameters, and fluid properties for at least two piping components in the piping network; and determining a location of a local shear stress maximum for each of the at least two piping components based on the information.

In another embodiment, the disclosed embodiments provide a method that includes receiving a location of a local shear stress maximum for each at least two piping components, wherein the location is determined by modeling localized fluid dynamics of the at least two piping components using one or more non-dimensional transfer functions; and placing a corrosion monitor at the location of the local shear stress maxima of the at least two piping components.

In another embodiment, the disclosed embodiments provide a computer readable medium that includes code for: receiving information about a piping network for fluids, wherein the information comprises geometrical parameters, operating condition parameters, and fluid properties for at least two piping components in the piping network; and determining a location of a local shear stress maximum for each of the at least two piping components based on the information.

In another embodiment, the disclosed embodiments provide a corrosion monitoring system that includes a processor, wherein the processor is configured to receive information about a piping network for fluids, wherein the information comprises geometrical parameters, operating condition parameters, and fluid properties for at least two piping components in the piping network, and wherein the processor is configured to determine a location of a local shear stress maximum for each of the at least two piping components based on the information.

DRAWINGS

The file of this patent contains at least one drawing executed in color. Copies of this patent with color drawing(s) will be provided by the Patent and Trademark Office upon request and payment of the necessary fee.

These and other features, aspects, and advantages of the present invention will become better understood when the following detailed description is read with reference to the accompanying drawings in which like characters represent like parts throughout the drawings, wherein.

DETAILED DESCRIPTION

In certain embodiments, provided herein are methods and systems for predicting the location of the highest shear stress points in a piping network. Knowing the location of local shear stress maxima may enable operators of piping networks to monitor locations of high shear stress in order to prevent leaks or other damage at those locations. Generally, pipes undergoing corrosion experience a loss of material in the pipe wall, leading to weakening of the pipes. This may be in part the result of repeated exposure to acidic crude oil or other fluids. Corroded pipes may be more likely to leak at areas of the pipe that also experience high shear stress. In addition, shear stress may accelerate the corrosion process. For example, in areas experiencing high shear stress, naturally occurring protective films containing sulfide that reduce the corrosion in the pipe may not have a chance to form. Similarly, in some cases protective additives may be added to the fluid in the pipe. In areas experiencing high shear stress, these additives, which may include sulfides or phosphates, may not have a chance to form protective films or coating on the pipe. Accordingly, areas of high shear stress may represent potential hot spots for pipe failure. In certain embodiments, the disclosed embodiments also provide information about the magnitude of local shear stress maxima and other fluid dynamics parameters in refinery piping systems. These local maxima of shear may then be arranged in order of magnitude, and decisions on which individual locations to monitor may be made depending upon the availability of the monitoring tools. The disclosed embodiments may identify a location, or range of locations that corrosion monitoring tools may be placed or located. The locations may be specified in certain embodiments to within a location of less than about 10% or less than about 5% of the total span or surface area of an individual piping component.

Figure 1:
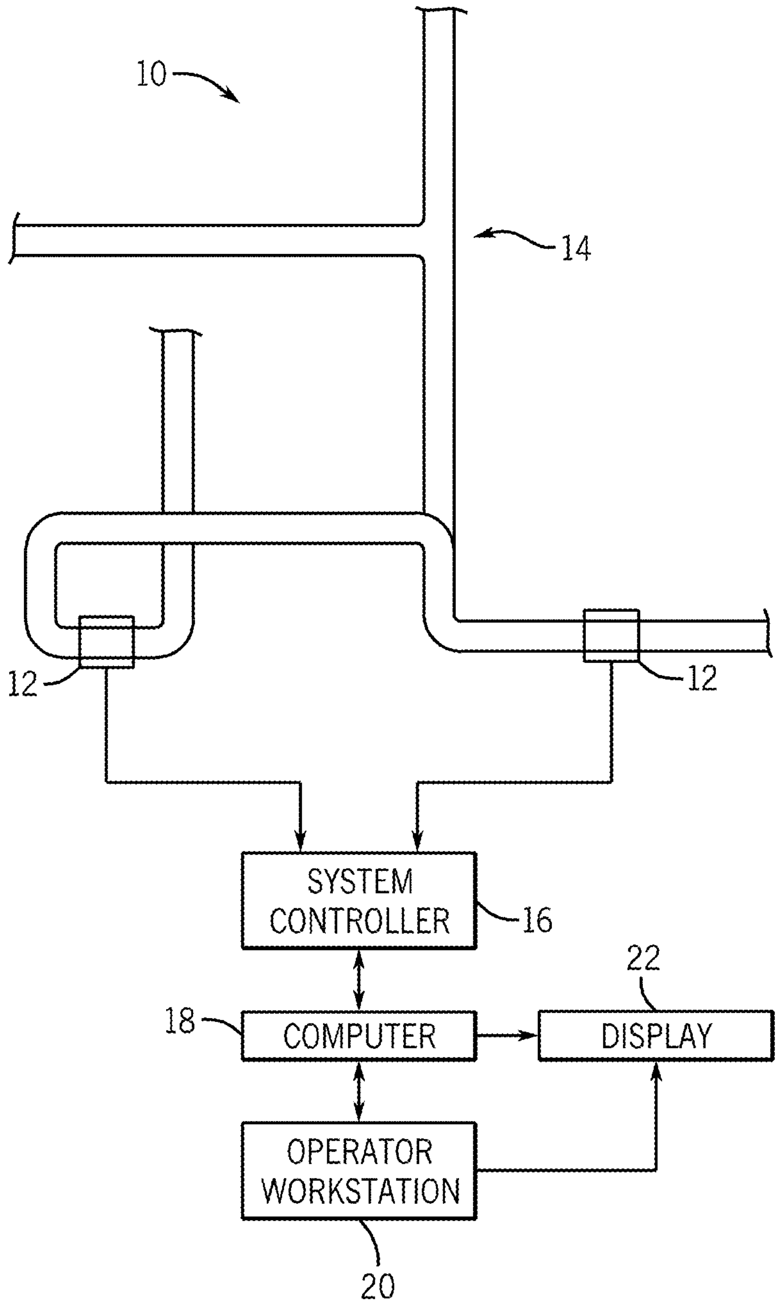
FIG. 1 illustrates an embodiment of a corrosion monitoring system in conjunction with a piping network.

Corrosion monitors may be placed at area of high shear stress in order to more accurately predict and/or prevent pipe failure. The disclosed embodiments may enable operators of piping networks to more effectively estimate pipe corrosion by enabling corrosion monitors to be placed on or near areas of pipe experiencing high shear stress. Accordingly, is envisioned that certain embodiments may be used in conjunction with systems for monitoring pipe corrosion. In the embodiment illustrated in FIG. 1, an exemplary system 10 may include a controller 16 that communicates with pipe corrosion monitors 12 mounted on an exemplary piping network 14. The pipe corrosion monitors 12 may include any suitable corrosion monitors, including ultrasound, X-ray, or resistance-based monitors. In one embodiment, an appropriate corrosion monitor is the Predator® Resistance Corrosion Monitor (General Electric, Trevose, Pa.). In such an embodiment, the corrosion monitor 12 may be permanently mounted to one or more locations on the piping network.

A computer 18 may be coupled to the system controller 16. Data collected by the sensors 12 may be transmitted to the computer 18, which includes a suitable memory device and processor. Any suitable type of memory device, and indeed a computer, may be adapted specific embodiments, particularly processors and memory devices adapted to process and store large amounts the data produced by the system 10. Moreover, computer 18 is configured to receive commands, such as commands stored upon or executed by computer-readable media (e.g. a magnetic or optical disk). The computer 18 is also configured to receive commands and piping network parameters from an operator via an operator workstation 20, typically equipped with a keyboard, mouse, or other input devices. An operator may control the system via these devices. In certain embodiments, an operator may input data related to the pipes and pipe networks into the computer 18. Where desired, other computers or workstations may perform some or all of the functions of certain embodiments. In the diagrammatical illustration of FIG. 1, a display 22 is coupled to the operator workstation 20 for viewing data related to shear stress locations in the piping network. Additionally, the data may also be printed or otherwise output in a hardcopy form via a printer (not shown). The computer 18 and operator workstation 20 may be coupled to other output devices which may include standard or special-purpose computer monitors, computers and associated processing circuitry. One or more operator workstations 20 may be further linked in the system for outputting system parameters, requesting examinations, viewing images, and so forth. In general, displays, printers, workstations and similar devices supplied within the system may be local to the data acquisition components or remote from these components, such as elsewhere within an institution or in an entirely different location, being linked to the monitoring system by any suitable network, such as the Internet, virtual private networks, local area networks, and so forth. In one embodiment, the system 10 may be partially or completely contained in a handheld device (not shown). Such a device may include a portable corrosion monitor 12.

Figure 2:
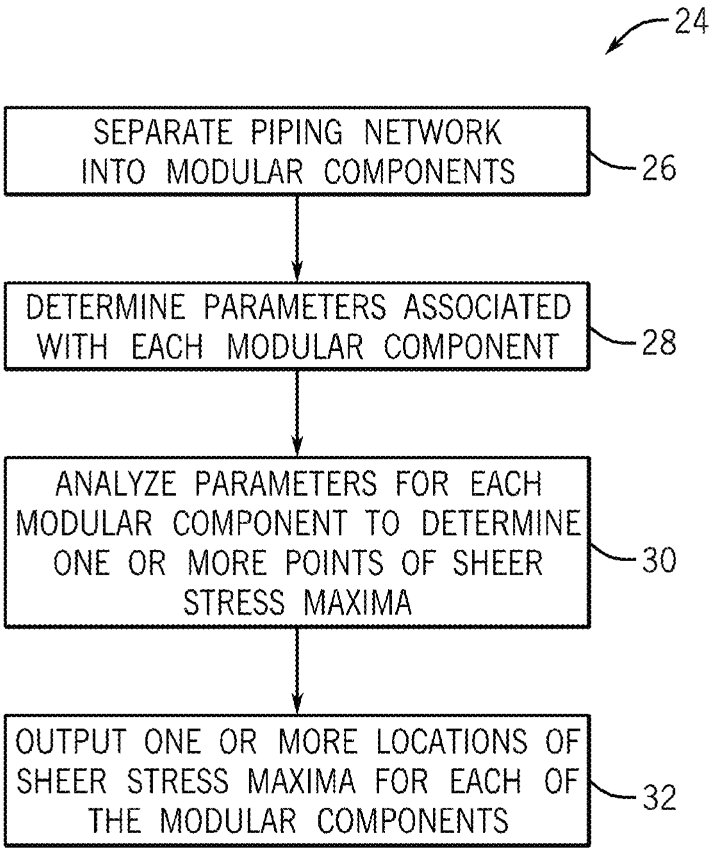
FIG. 2 is a flowchart of a method of identifying local shear stress maxima in modular components of a piping network in accordance with an exemplary embodiment.

FIG. 2 is a flowchart 24 according to one embodiment. The steps of the flowchart 24 may be performed in conjunction with a computer 18 containing a processor programmed with instructions to perform the steps, such as a system 10 as provided herein. In step 26, a given piping network, such as a high temperature single or multiphase regime, may be modeled in order to reduce a complex system into a series of modular parts. Any suitable series of modular parts may be identified. In a specific embodiment, modular parts may be separated according to distributions in pipe geometry. For example, modular parts may be delineated by a change in geometry that occurs along the flow path of the fluid. A straight pipe may be a single modular component, regardless of length, and may join another modular component that is characterized by a bend, turn, connection, or arc. The modular components are separated for the purposes of modeling fluid dynamics and may or may not be components that are physically separable from one another. It should be understood that a series of modular components may form a seamless piping system or subsystem.

In the single-phase regime embodiment or the multi-phase regime embodiment, factors that may be considered when modeling the system include velocity of fluid, viscosity of fluid, density of fluid, dimensions of the configuration, and surface roughness of the pipe. Variation in velocity, temperature, viscosity, density and dimensions of components may be taken into account for a wide range of operating conditions and fluids, such as crude oils. In some embodiments, the internal surface of the piping components may be assumed to be smooth. In such embodiments, the shear stress prediction may result in lower values associated with the magnitude of the stress as a result of the smooth, rather than rough, surface. However, the location prediction may be generally unchanged. In any piping, roughness is a function of age of piping and its material. At locations where shear is higher, the pipe surface may become rougher with time, thus resulting in even more increased shear stress at those points.

Once separated into its modular components, the individual components may be further characterized in step 28. Generally, such further characterization may include specific geometric properties of the individual components and may further include relative relationships between different modular components. In one embodiment, once the characteristics of a particular piping network have been determined, these characteristics may be used as a reference for similar networks. Once the parameters associated with the fluid and each modular component have been determined, the parameters may be further analyzed in step 30 to determine one or more locations of shear stress maxima in each component. The analysis may involve correlating the fluid dynamic parameters with shear stress locations and magnitude. The correlation may involve fluid dynamic modeling to determine one or more non-dimensional transfer functions that describe the system. In addition, the correlation may involve using empirically derived data to describe the fluid dynamic properties and/or validate the equations determined by the model. Upon determining one or more shear stress maxima, the location of the maxima on the modular component may be communicated to an operator in step 32. The operator may then monitor the pipe for corrosion at the shear stress maxima locations.

Figure 3:
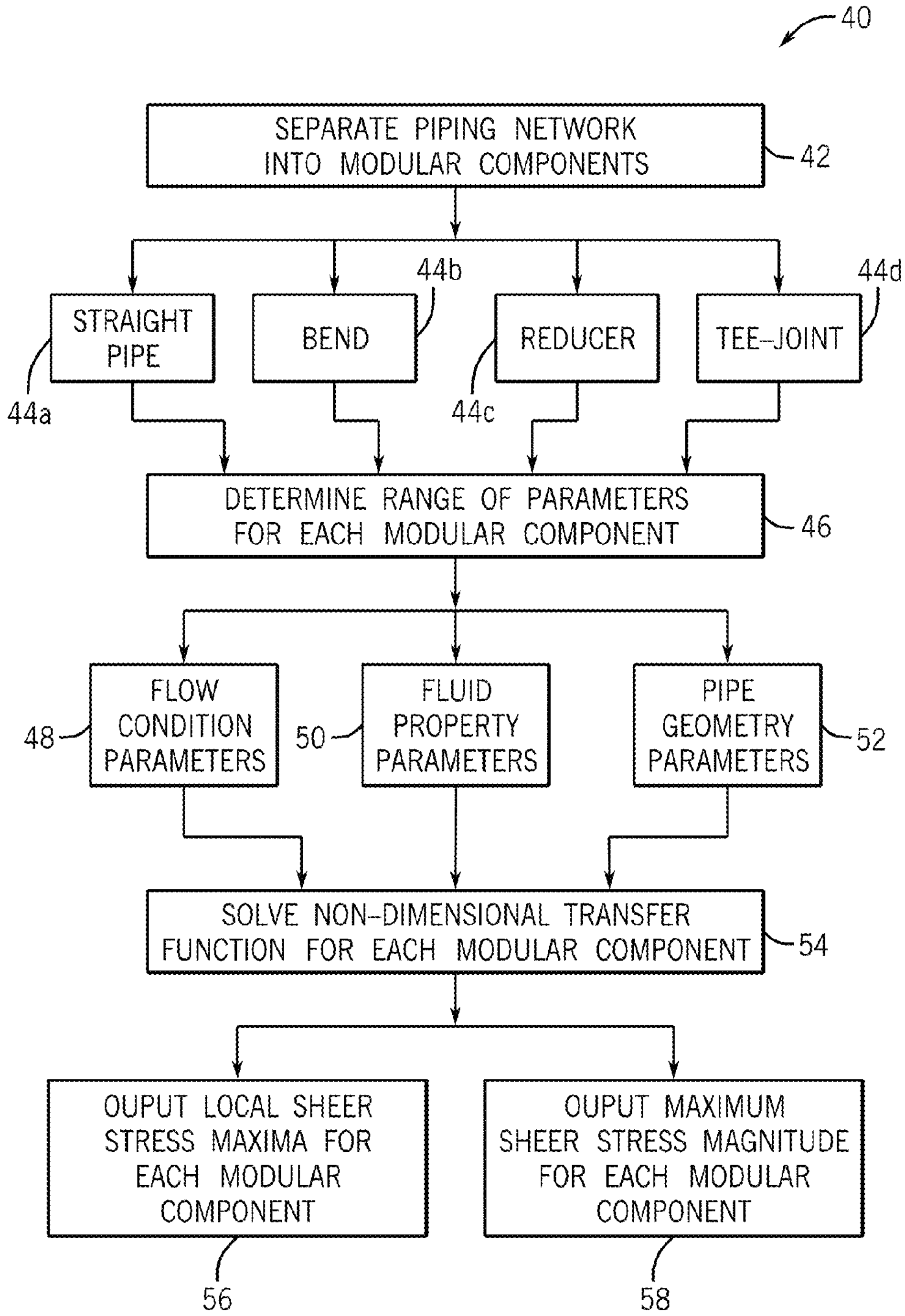
FIG. 3 is a flowchart of a method of identifying local shear stress maxima in modular components of a piping network in accordance with an exemplary embodiment.

FIG. 3 is a flowchart 40 of a specific embodiment of the disclosed embodiments. In step 42, the piping network may be simplified into certain standard parts, such as straight pipes 44*a*, bends 44*b* (such as U-bends), reducers 44*c*, and/or joints 44*d*. In step 46, an operator may determine a value or a range of value for multiple parameters associated with the pipe and the fluid in the piping network. For example, an operator may determine pipe geometry parameters 52, such as the length, diameter, and shape of each component. For components including bends, the operator may determine the degree of the bend, and the arc length. For reducers, the operator may determine the degree or angle of tapering in the pipe. In addition, the operator may determine the composition of the pipe, including the surface roughness on the inside wall of the pipe. An operator may also determine the fluid property parameters 50, include fluid composition, the number of phases (liquid, solid, or gas), corrosivity, acidity, density and viscosity. Additionally, certain parameters of the operational conditions 48 may be determined, such as fluid temperature and flow velocity. The flow may be turbulent, which in certain embodiments may be defined as a Reynolds number $\sim 10^{e7}$.

In certain embodiments, in step 54, the disclosed embodiments may use fluid dynamic modeling to determine one or more non-dimensional transfer functions that may be solved for each of the different components that take into account all possible ranges of operating conditions, geometrical parameters and fluid properties and their interaction effects. A modular approach is first adopted and the network is simplified into commonly used piping components. A range of operating conditions, geometrical parameters and fluid properties are then identified for the region of interest. In certain embodiments, the shear stress at the pipe wall may be represented by $\tau o = \tau o(\mu, \rho, V, D, e)$, where $\mu$ is the dynamic or absolute viscosity, $\rho$ is the density of the fluid, V is the mean velocity of the flow, e (or $\epsilon$) is the surface roughness of the pipe, and may also be related to the geometry. As noted, the surface of the pipe may be assumed to be smooth in certain embodiments. The complexity may be reduced to two variables by use of non-dimensional variables. The non-dimensional shear stress can be expressed as:

$$\frac{\tau_o}{\frac{\rho V^2}{2}} = f\left(\frac{\rho VD}{\mu}, \frac{e}{D}\right),$$

$$\frac{\rho VD}{\mu} = Re, \text{ Reynolds number (non-dimensional), and}$$

$$e/D = \text{relative roughness.}$$

The shear stress is also related to geometric parameters. For example, for 90° circular bend and U bend, the radius of curvature of the bend (R) and the radius of pipe (r) may be taken into account. For a tee-joint, the radius of pipe (r), and for a reducer, the inlet radius to reducer, the outlet radius to reducer, and the reducer length. Using the inputs for individual components, the desired outputs are local maximum shear 58 ($\tau_{max(local)}$) and location 56 of shear maxima ($\theta_1$ & $\theta_2$ and x). Input and output parameters may be converted into non-dimensional form using any suitable technique, such as the Buckingham Pi theorem. Non-dimensional inputs and outputs obtained for circular bend & U-bends are Re and Radius ratio (inputs) and $\bar{\tau}_{max(local)}$, $\theta_1$, $\theta_2$, $\bar{x}$ (outputs); for tee-joints are Re (inputs) and $\bar{\tau}_{max(local)}$, $\theta_1$, $\theta_2$, $\bar{x}$ (outputs); and for reducers are Re, slope, and Diameter ratio (inputs), and $\bar{\tau}_{max(local)}$ (outputs). In certain embodiments, $\bar{\tau}_{max(local)}$ may be expressed as:

$$\bar{\tau}_{\max(local)} = \frac{\tau_{\max(local)}}{\frac{1}{2}\rho u^2}$$

$$\bar{x} = \frac{x}{2r},$$

where $$Re = \text{Reynolds Number} = \frac{2\rho ur}{\mu},$$

$$\text{Radius ratio} = \frac{R+r}{r},$$

$$\text{Slope} = \frac{r_1 - r_2}{\text{length}},$$

$$\text{and the Diameter ratio} = \frac{r_1}{r_2}.$$

The final functional form may be:

A. For circular and U-bend components
- $\bar{\tau}$max(local)=$f_1$(Re, radius ratio)
- $\theta_1$=$f_2$ (Re, radius ratio)
- $\theta_2$=$f_3$ (Re, radius ratio)
- $\bar{x}$=$f_4$ (Re, radius ratio)

B. For tee-joints
- $\bar{\tau}_{max(local)}$=$g_1$(Re)
- $\theta_1$=$g_2$(Re)
- $\theta_2$=$g_3$(Re)

C. For reducers
- $\bar{\tau}$max(local)=$h_1$(Re, slope, diameter ratio)

In certain embodiments, a range of these non-dimensional inputs may be identified for the range of operating conditions, fluid properties and geometrical parameters. One particular embodiment for a range of Re is provided in Table 1

TABLE 1

| Range of input parameters | |
|---|---|
| | Re |
| High | 2.00E+07 |
| Low | 2.70E+04 |

The disclosed embodiments may use modified k-$\epsilon$ models with mesh resolved up to the wall. Realizable k-$\epsilon$ model has analytically-derived differential formulas for effective viscosity that accounts for low Reynolds number effects. Velocity inlet boundary condition may be used where a uniform velocity profile is specified. For turbulence parameters, turbulent intensity and hydraulic diameter are specified as inputs; which are calculated depending upon the Reynolds number and pipe diameter. For hydraulic diameter, the equation may be expressed as Hydraulic diameter=Diameter of the pipe, and for the turbulent intensity, the equation may be expressed as Turbulent intensity=0.16 $(Re)^{-1/8}$. Outflow boundary condition may be used, i.e. normal gradient of velocity may be assumed to be zero. In certain embodiments, the pressure outlet condition gives identical results. In certain embodiments, no slip boundary condition is specified at the walls.

FLUENT® 6.1 (Fluent Inc., Lebanon, N.H.) was used to solve the governing equations with appropriate discretization schemes and boundary conditions. A three-dimensional incompressible turbulent steady state case may be solved in double precision. Higher order schemes may be used for discretizing momentum and turbulence equation; the first cell size requirement is of order $10^{-6}$, which may be appropriate for increased accuracy relative to wall effects. It has been observed that pressure discretization scheme has insignificant effects on wall shear stress.

The present techniques relate to correlating fluid dynamic parameters with shear stress hot spots. As noted, the correlation may take the form of fluid dynamic modeling to generate one or more non-dimensional transfer equations that may be solved for specific parameters unique to a particular piping system. In one embodiment, a general non-dimensional transfer equation may be developed that describes the piping system as a whole, including various types of piping components with different geometry. In another embodiment, a series of non-dimensional transfer equations may describe a series of different piping components. In another embodiment, the correlation may be developed at least in part by using empirically derived data. For example, such data may include wall thickness measurements of piping systems that are taken over time, combined with the geometric and operating parameters of such systems. In one embodiment, mathematically derived correlations may be validated using empirical data such that any equations that describe the piping system may be improved over time as empirical data becomes available.

Examples

The following examples provide specific embodiments of the present techniques.

I. Flow Properties of a 90° Circular Bend

Figure 4:
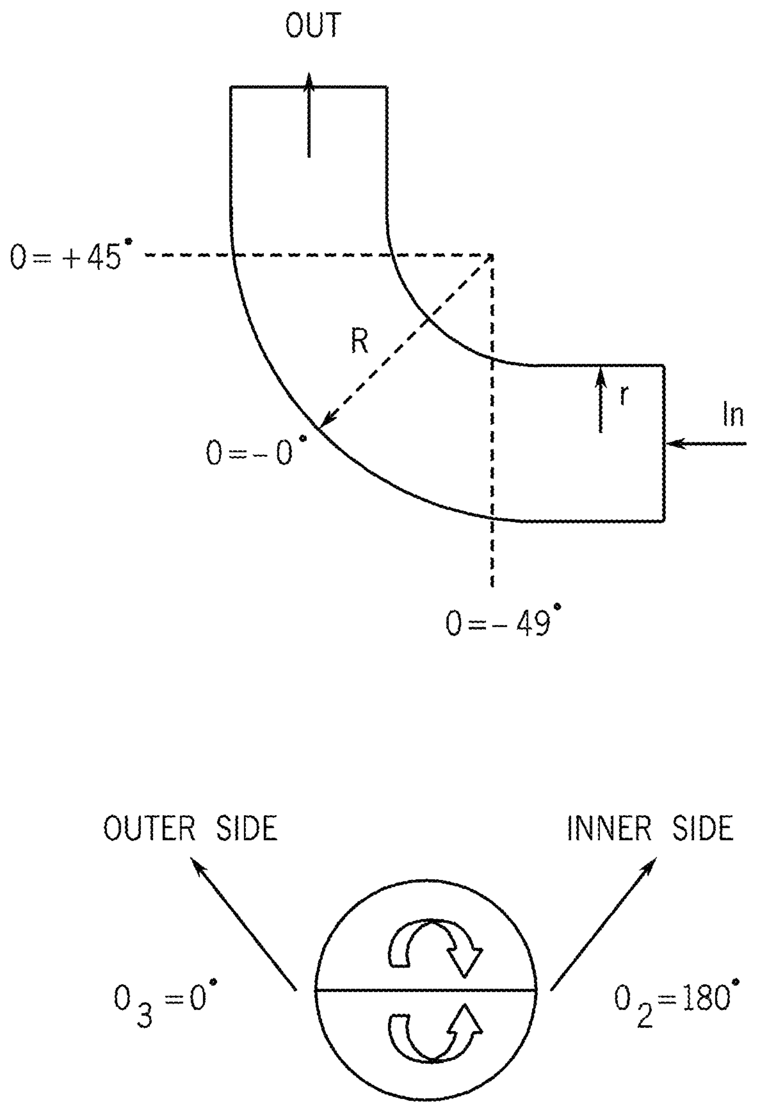
FIG. 4 shows exemplary naming conventions for modeling a 90° circular bend in accordance with an exemplary embodiment.
Figure 5A:
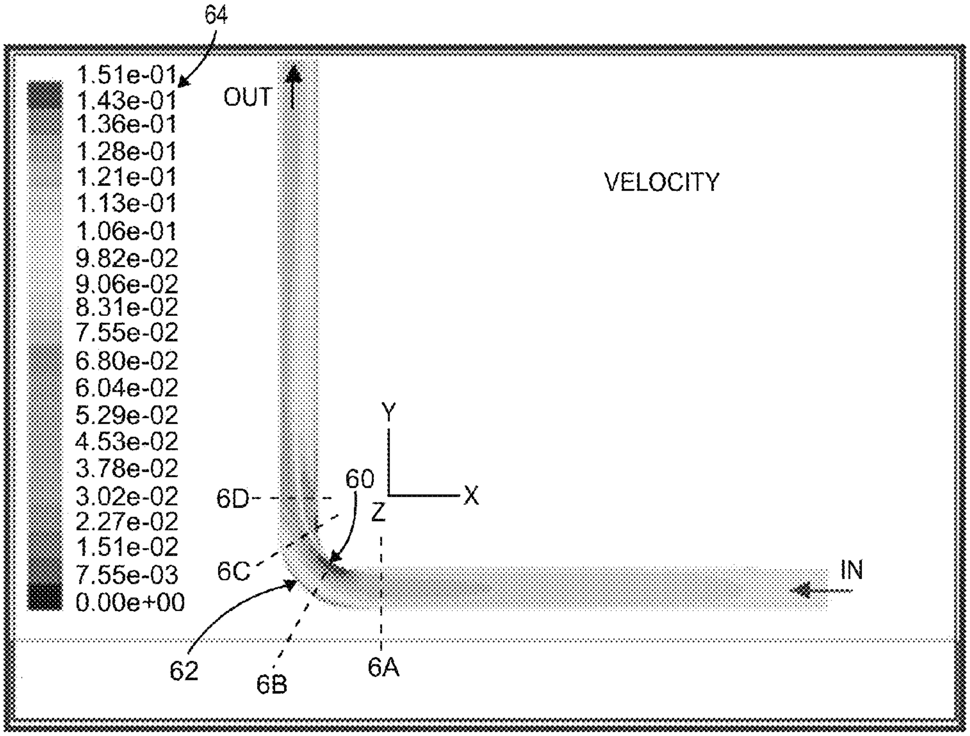
FIG. 5A shows an exemplary fluid velocity profile through a 90° circular bend in accordance with an exemplary embodiment.
Figure 5B:
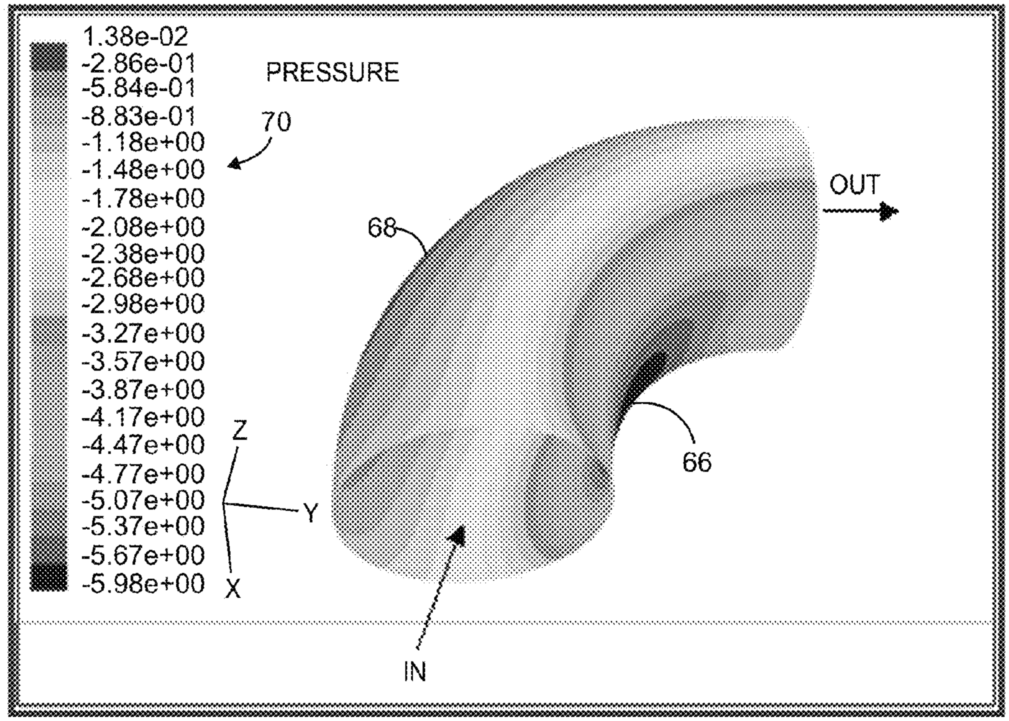
FIG. 5B shows an exemplary pressure profile through a 90° circular bend in accordance with an exemplary embodiment.
Figure 5C:
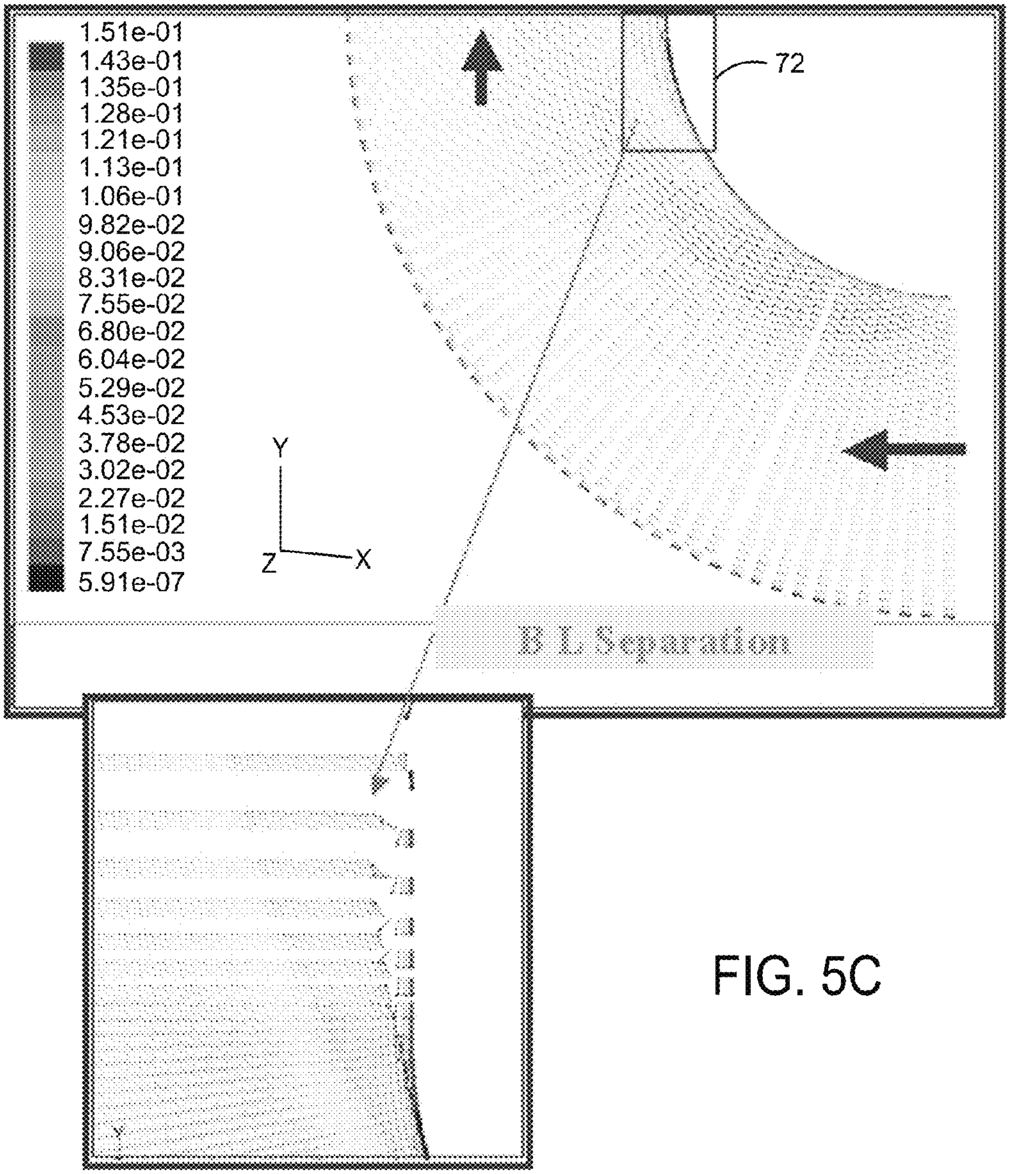
FIG. 5C shows an exemplary boundary layer separation profile through a 90° circular bend in accordance with an exemplary embodiment.
Figure 6:
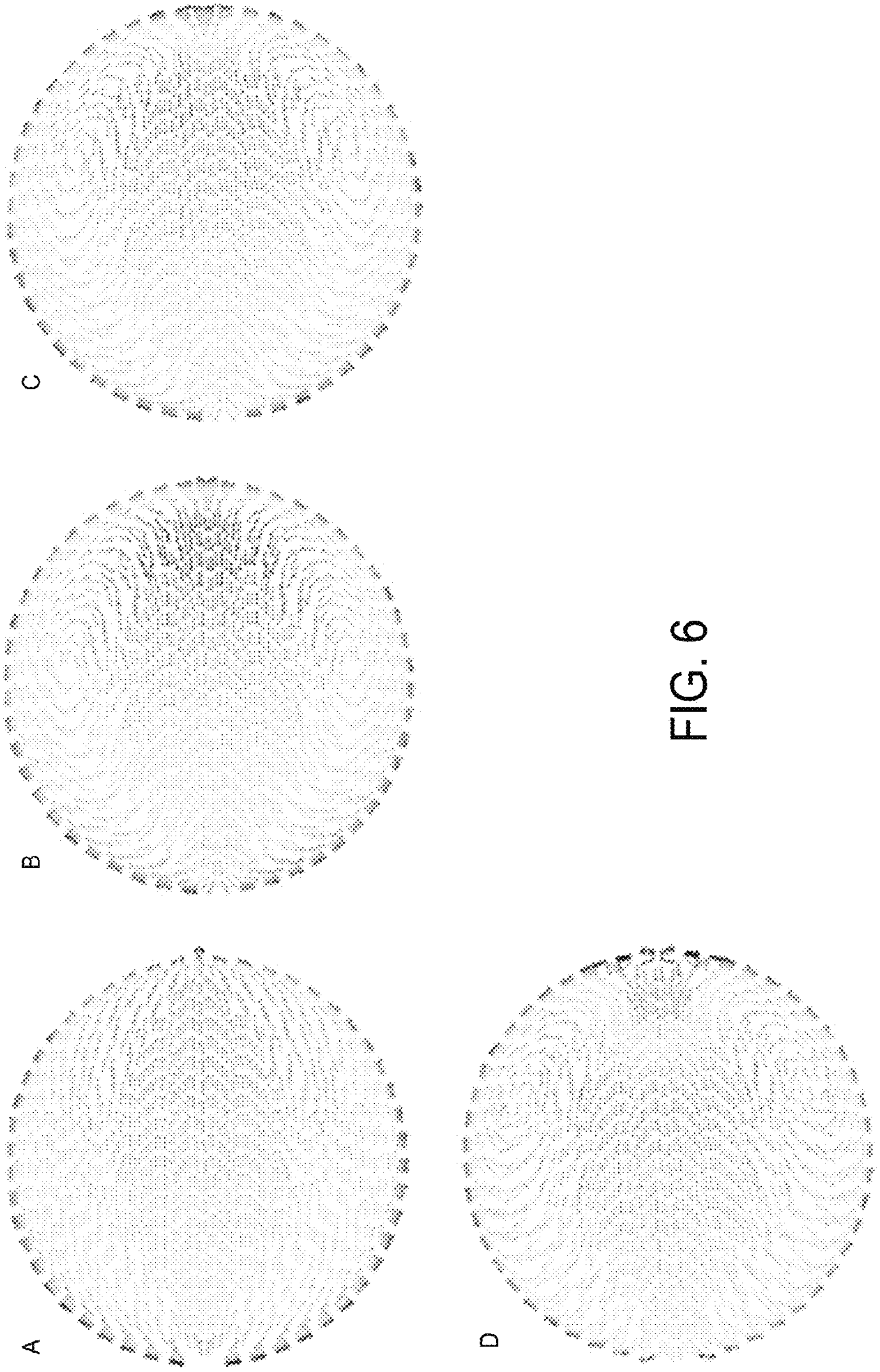
FIG. 6 shows secondary flows through a 90° circular bend in accordance with an exemplary embodiment.

The disclosed embodiments were used to examine the flow properties of an exemplary 90° circular bend. The naming conventions used for the modeling of the 90° circular bend are shown in FIG. 4. The 90° circular bend was modeled at three different radius ratios; 3.833, 4.67 and 5.5, under three operating conditions, and at Reynolds numbers $2.7\times10^4$, $7.3\times10^5$ and $2\times10^7$. FIG. 5A is a velocity profile of the 90° circular bend. From the velocity profile shown in FIG. 5A at the symmetry plane, with velocity magnitudes in axis 64 it was observed that, as the fluid moves along the bend, maximum velocity, shifts from inner side of the bend 60 to the outer side 62. This outer higher velocity zone keeps moving with the flow even up to diameters of 12 or greater. However, no change in the shear stress location and magnitude was seen even when the exit length of the pipe is decreased/increased. FIG. 5B shows the static pressure, magnitude shown in axis 70, at the bend wall, whereby pressure at the inner wall 66 is lower than the outer wall 68, which is a result of the balance of the centrifugal force. There was a boundary layer separation observed some distance away from the bend outlet as shown in FIG. 5C. This is because in the region 72 velocities are very low in the vicinity of the wall and adverse pressure gradient develops. FIG. 6 shows velocity vectors at cross sections A, B, C, and D, shown in FIG. 5A. It was observed that the flow is towards the outer side of the bend nearer to the symmetry plane. This is because centrifugal forces are higher in this zone (low radius of curvature) as well as the tendency of the fluid to cover least distance as the fluid came towards the inner radius. This created Dean's Vortices in which the area of recirculation shifts towards the inner portion of the bend as the fluid moves in the bend. This is a result of centrifugal forces decreasing due to lesser fluid in the inner zone as the fluid moves in the bend.

Figure 7:
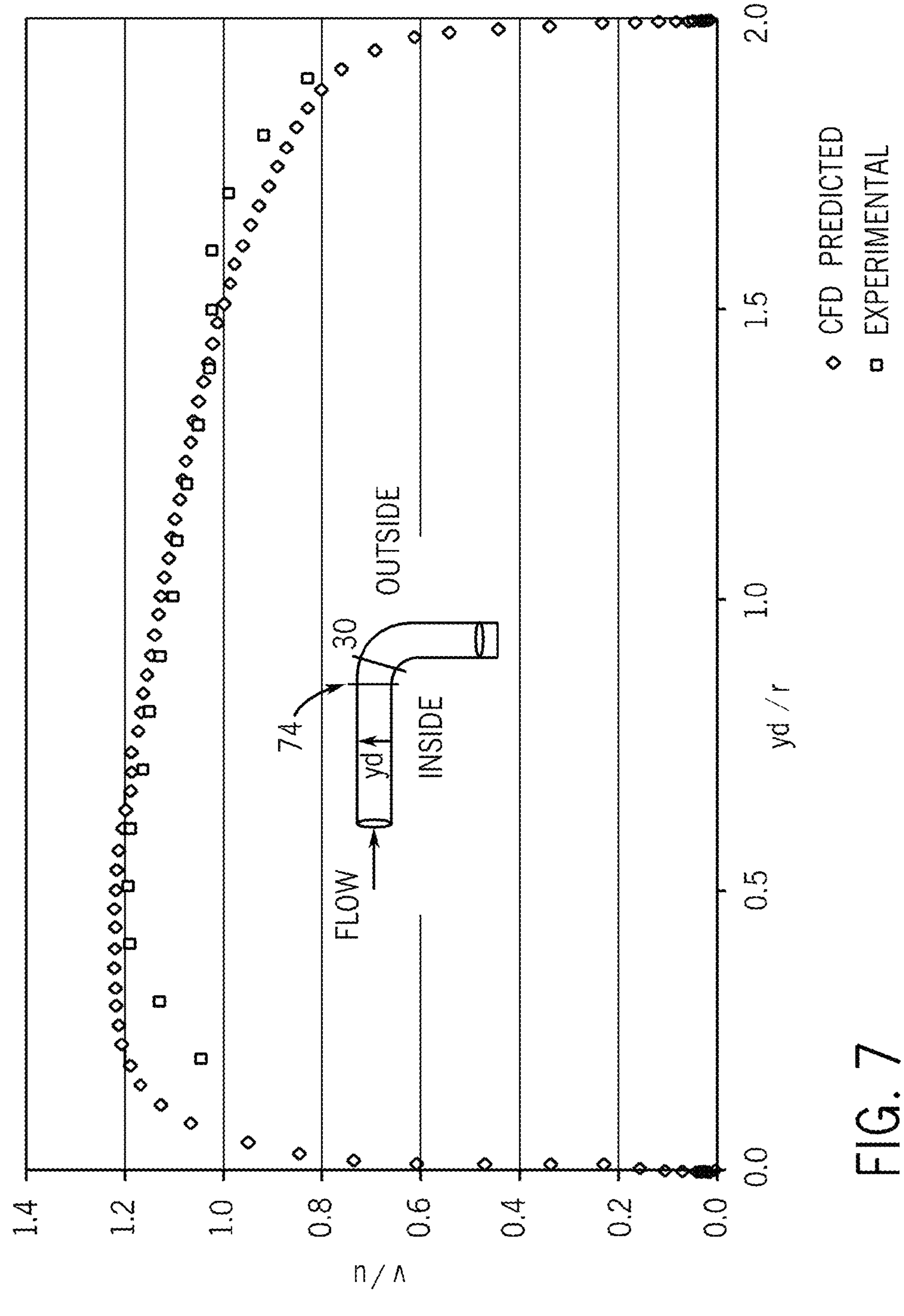
FIG. 7 is a comparison of the predicted computational velocity profile in FIG. 5A and the experimental results at one section of the exemplary 90° circular bend.
Figure 8:
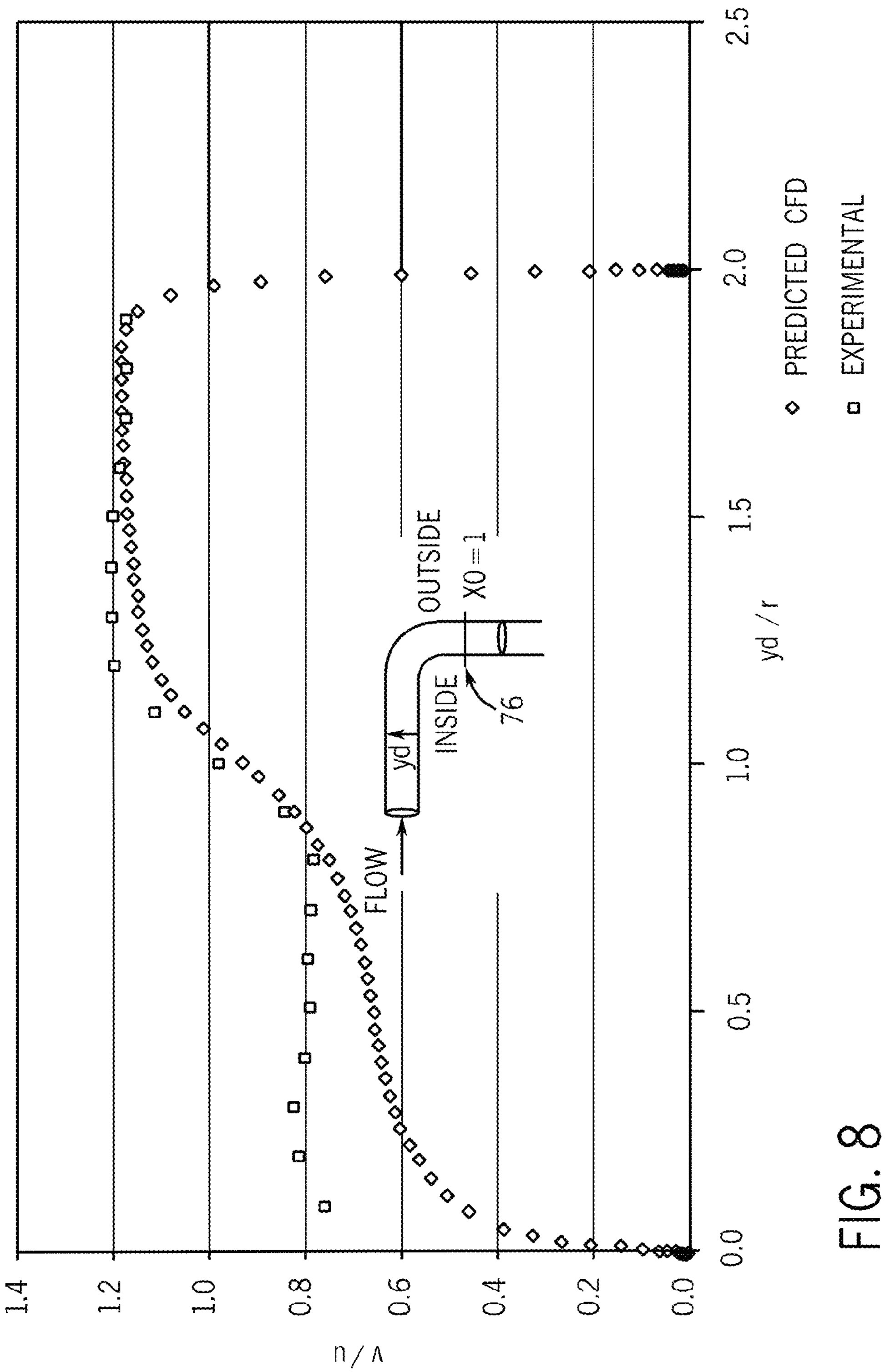
FIG. 8 is a comparison of the predicted computational velocity profile in FIG. 5A and the experimental results at an alternative section of the exemplary 90° circular bend.

FIG. 7 is a graph of velocity profile comparison at the symmetry plane line of the 90° circular bend at a point 74 30° away from the bend inlet. The lowest possible radius graphed on the x-axis is 0 (inner zone), with 2 as the highest radius outer zone of the bend. On this plane, velocities were higher at the inner wall because the bulk fluid would follow the least radius path, i.e. the inner radius and then shift outwards due to centrifugal action because of the curvature of the bend. This effect was observed in the graph in FIG. 8, which shows the comparison at a plane 76 one diameter away from the bend outlet. The experimental data was compared with computational results and reflected that model captured the flow physics. The slight difference between the experimental and computational values may be attributed to either experimental error or certain parameters like uneven surface, which were eliminated in the calculations.

Figure 9:
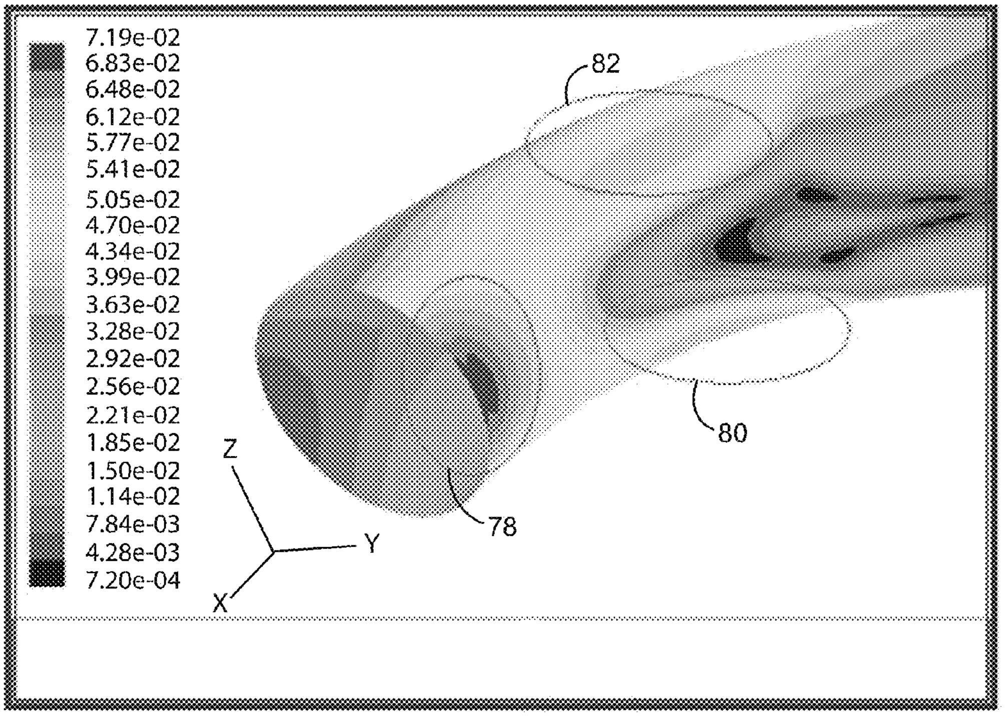
FIG. 9 is a representation of fluid dynamic modeling of the local shear stress maxima for the exemplary 90° circular bend component in accordance with an exemplary embodiment.

FIG. 9 is a schematic of the location of the shear stress hot spots 78, 80, and 82 observed for the modeled 90° circular bend. It was observed that maximum value of shear stress varied with radius ratio and Reynolds number. Three local shear maxima were seen in the cases studied for three radius ratios and three Reynolds numbers. One maximum 78 was noticed just after the bend inlet, which is due to change in axial velocity—primary flow gradients. The second two maxima 80 and 82 were the result of change in secondary current and are mirror images of each other. These are located between the outlet of the bend and centre of the bend. It has been observed that the ratio between the maxima arising out of secondary flows and primary flow varies from 0.77 to 1.05.

Figure 10:
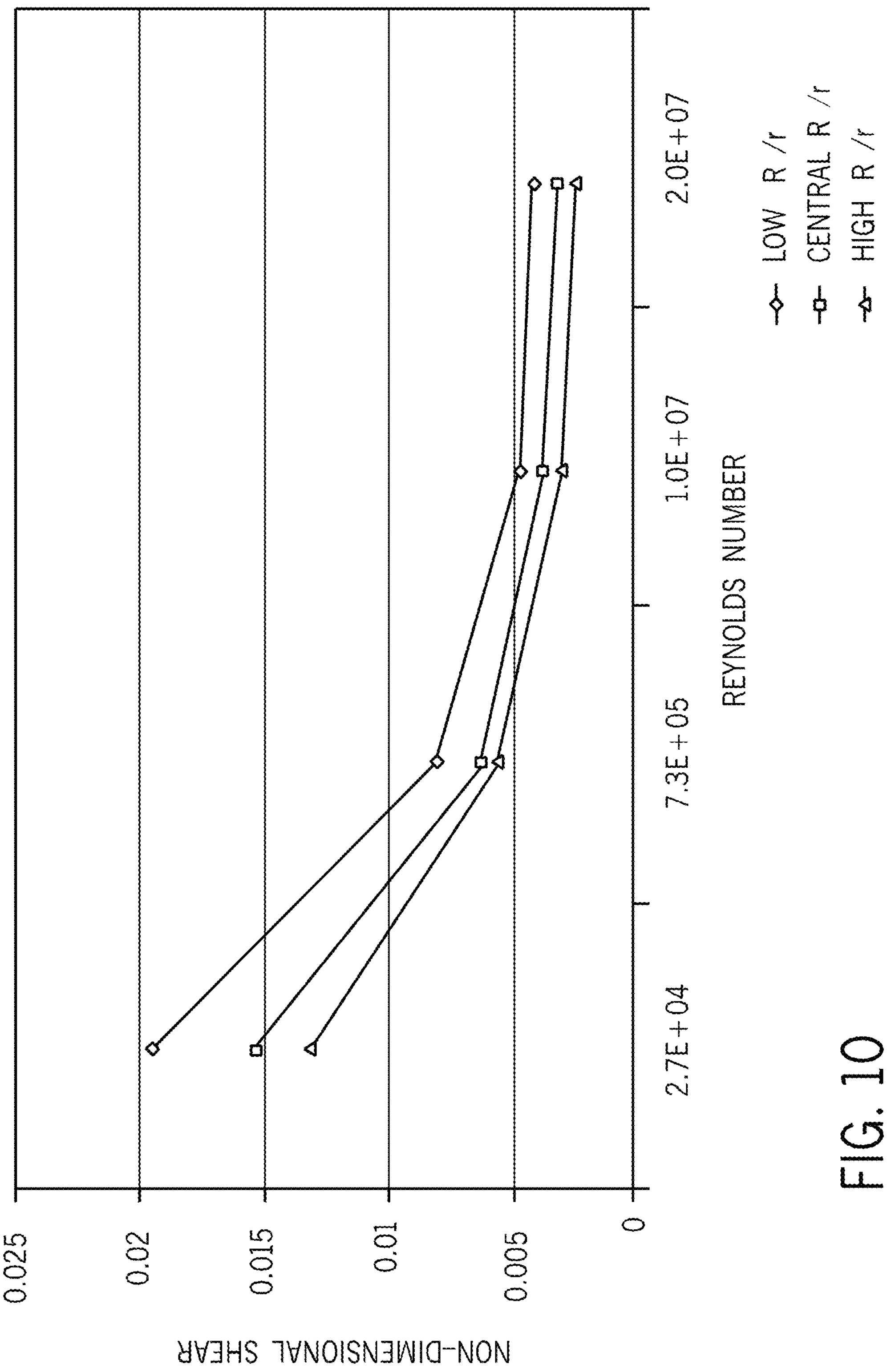
FIG. 10 shows the variation of the non-dimensional shear stress with Reynolds number and radius ratio at one shear stress maximum location for the exemplary 90° circular bend component in accordance with an exemplary embodiment.
Figure 11:
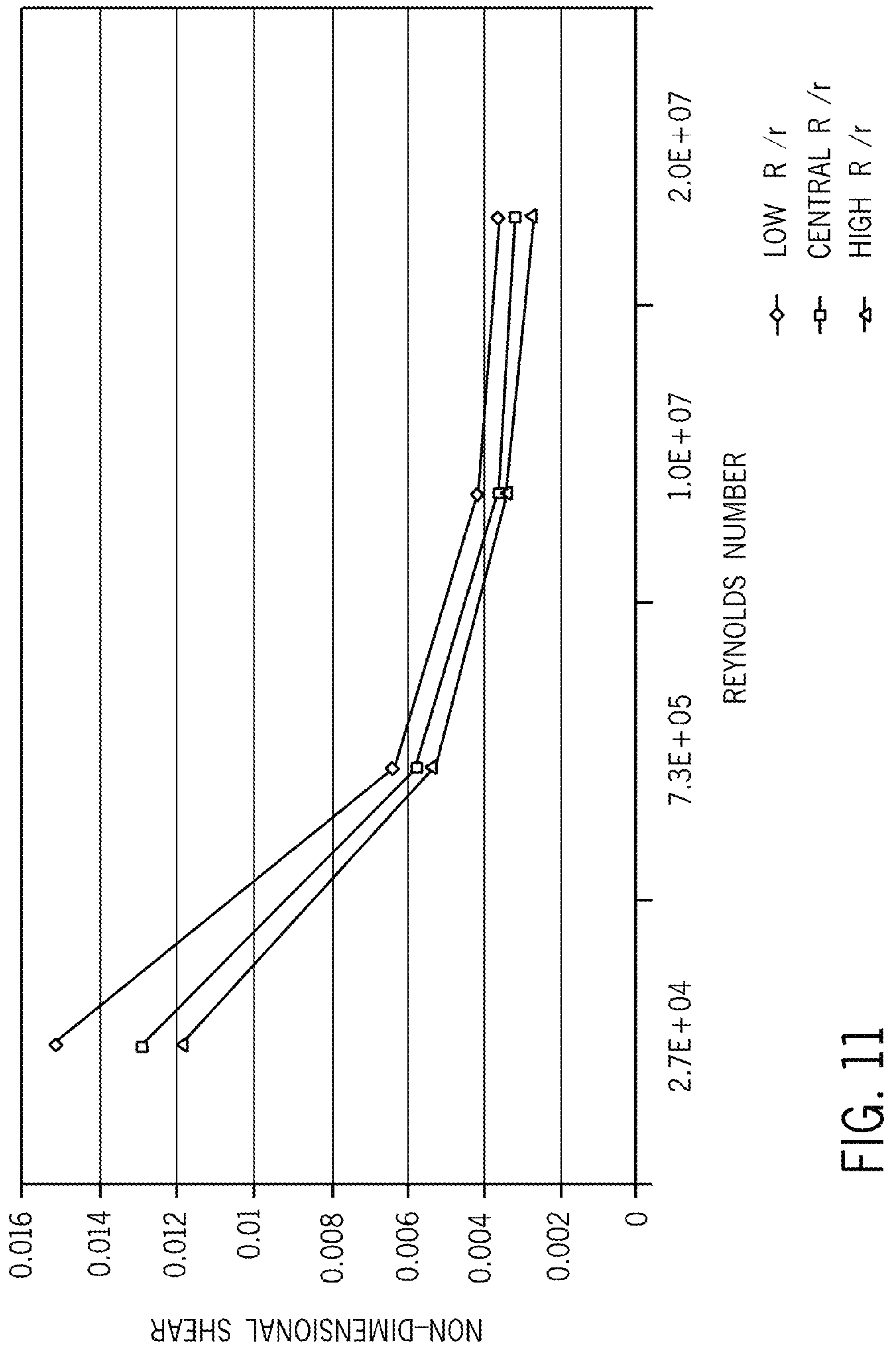
FIG. 11 shows the variation of the non-dimensional shear stress with Reynolds number and radius ratio at secondary shear stress maxima locations for the exemplary 90° circular bend component in accordance with an exemplary embodiment.

FIG. 10 is a graph that shows the variation in magnitude of local maximum non-dimensional shear stress because of primary flow (local maximal) with Reynolds number and radius ratio. As Reynolds number is increased (while keeping the radius ratio constant), the shear decreases. This is because an increase in Reynolds number means either decreasing viscous forces that leads to decrease in shear or increase in convection part. This leads to increase in shear but a much higher increase in convection part, which again causes the non-dimensional shear to decrease. It was observed that as the radius ratio is increased, this may lead to increase in convection term and hence decrease in non-dimensional shear. Similar results were seen in the trends for local maxima 2 & 3, shown in FIG. 11, which were the results of secondary flow gradients.

A transfer function fitted for these local maxima takes the functional form:

$$\tau_{iLocalMax}=a_i b_i^{r/r+R}\rho^{1+c_i}u^{2+c_i}r^{c_i}\mu^{-c_i}$$

where a, b and c for the modeled bend are shown in Table 2.

TABLE 2

Values of constants for the local maxima shear stress transfer function for 90° Circular bend

| | Max1 | Max2 & 3 |
|---|---|---|
| a | 0.023570077 | 0.024577822 |
| b | 118.89425 | 15.1204467 |
| c | −0.230485 | −0.2068692 |

It was observed that variation in location for these maxima is within 10% of the total span of the circular bend, as shown in Table 3.

TABLE 3

Location of Local Maxima for 90° Circular bend

| | Max1 | Max2 | Max3 |
|---|---|---|---|
| $\theta_1$ (in degree) | −45 to −28.6 | 19.7 to 23.3 | 19.7 to 23.3 |
| $\theta_2$ (in degree) | 180 | 138 to 148 | −138 to −148 |

Accordingly, a modular component with the geometric characteristics of a 90° circular bend, or a similar shape, may be modeled with a non-dimensional transfer equation. Certain geometric parameters, as well as operating and fluid parameters, may be used as inputs to the equation to locate or predict local shear stress maxima for this component.

II. Flow Properties of a U bend

Figure 12:
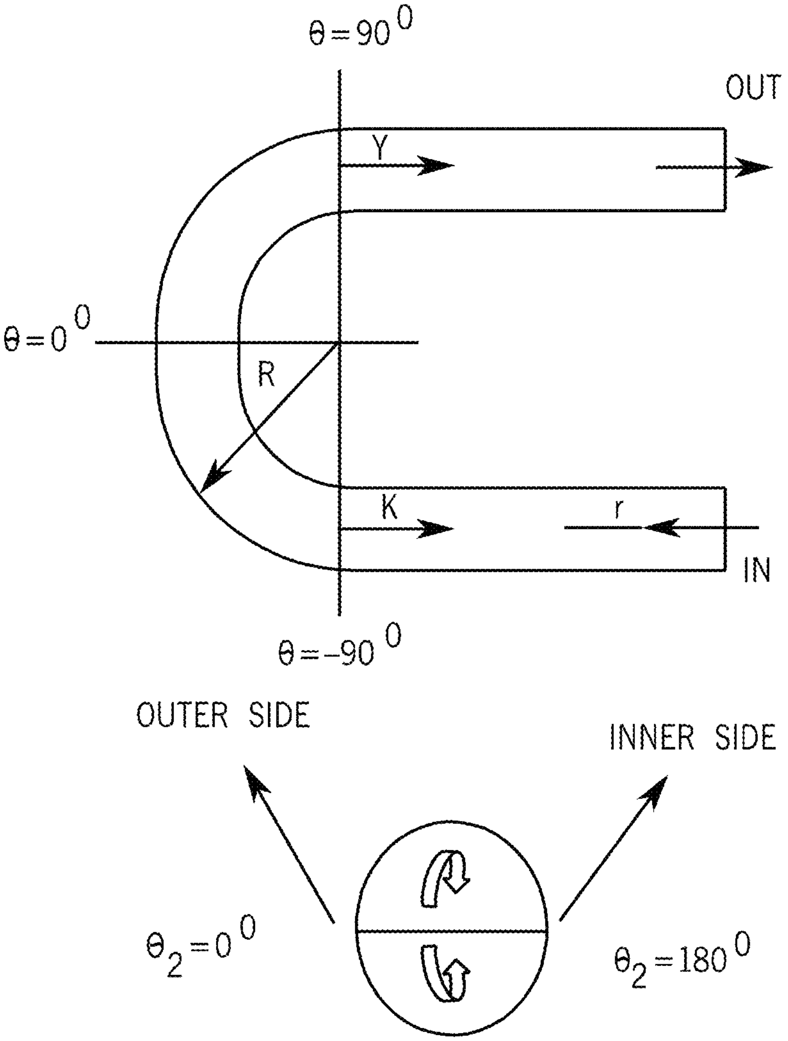
FIG. 12 shows exemplary naming conventions for modeling an exemplary U bend in accordance with an exemplary embodiment.
Figure 13A:
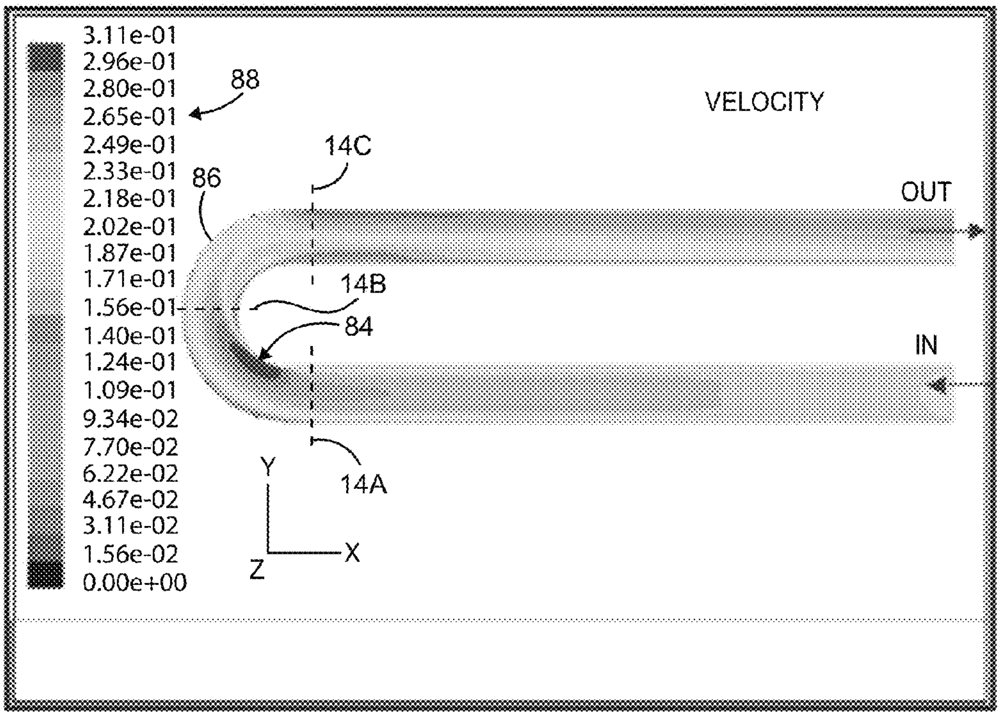
FIG. 13A shows an exemplary fluid velocity profile through a U bend in accordance with an exemplary embodiment.
Figure 13B:
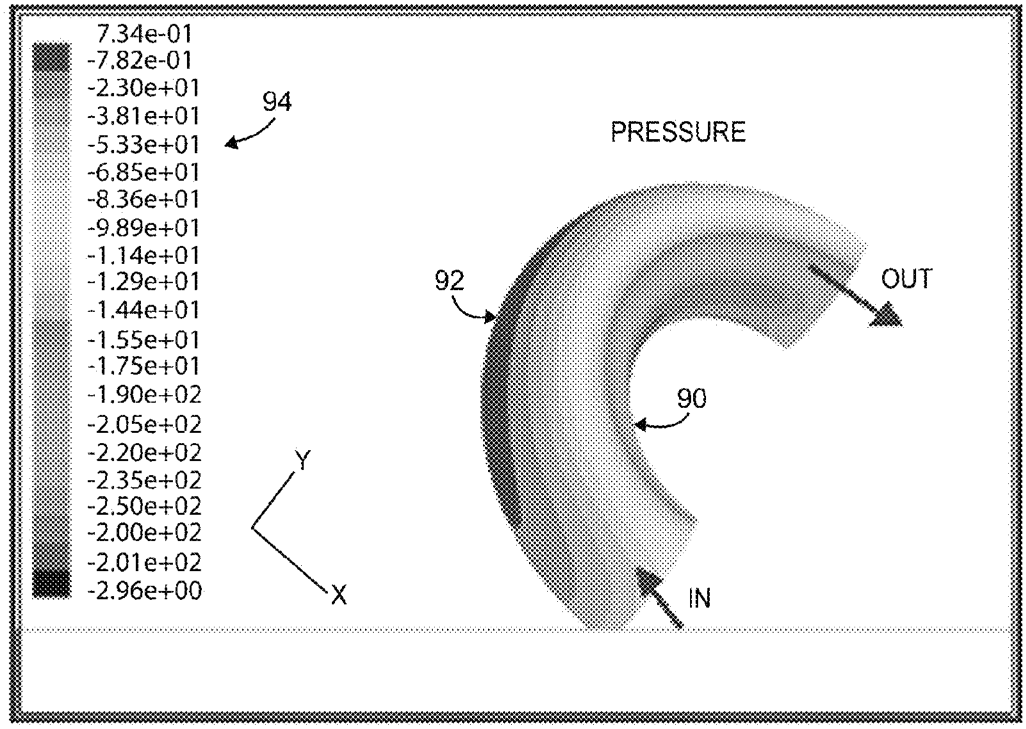
FIG. 13B shows an exemplary pressure profile through a U bend in accordance with an exemplary embodiment.
Figure 13C:
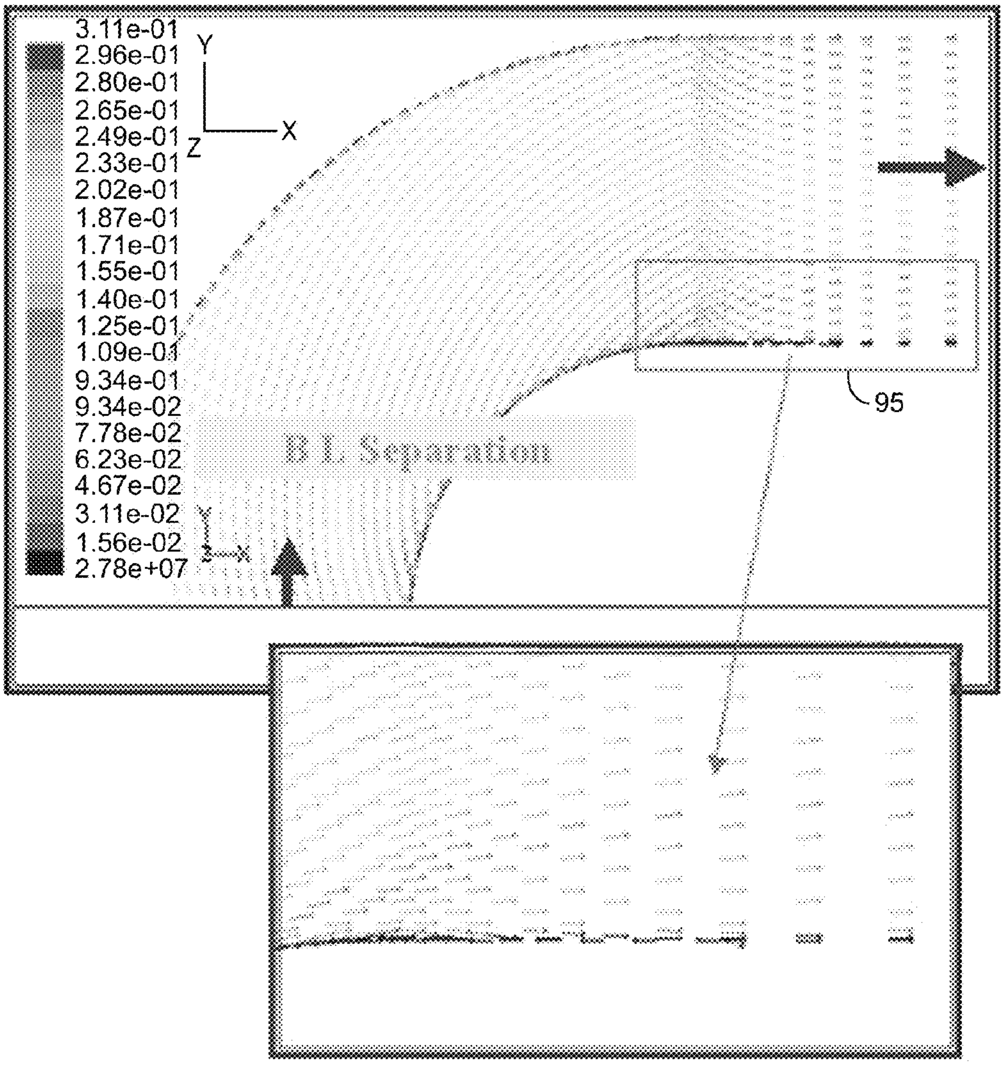
FIG. 13C shows an exemplary boundary layer separation profile through a U bend in accordance with an exemplary embodiment.
Figure 14:
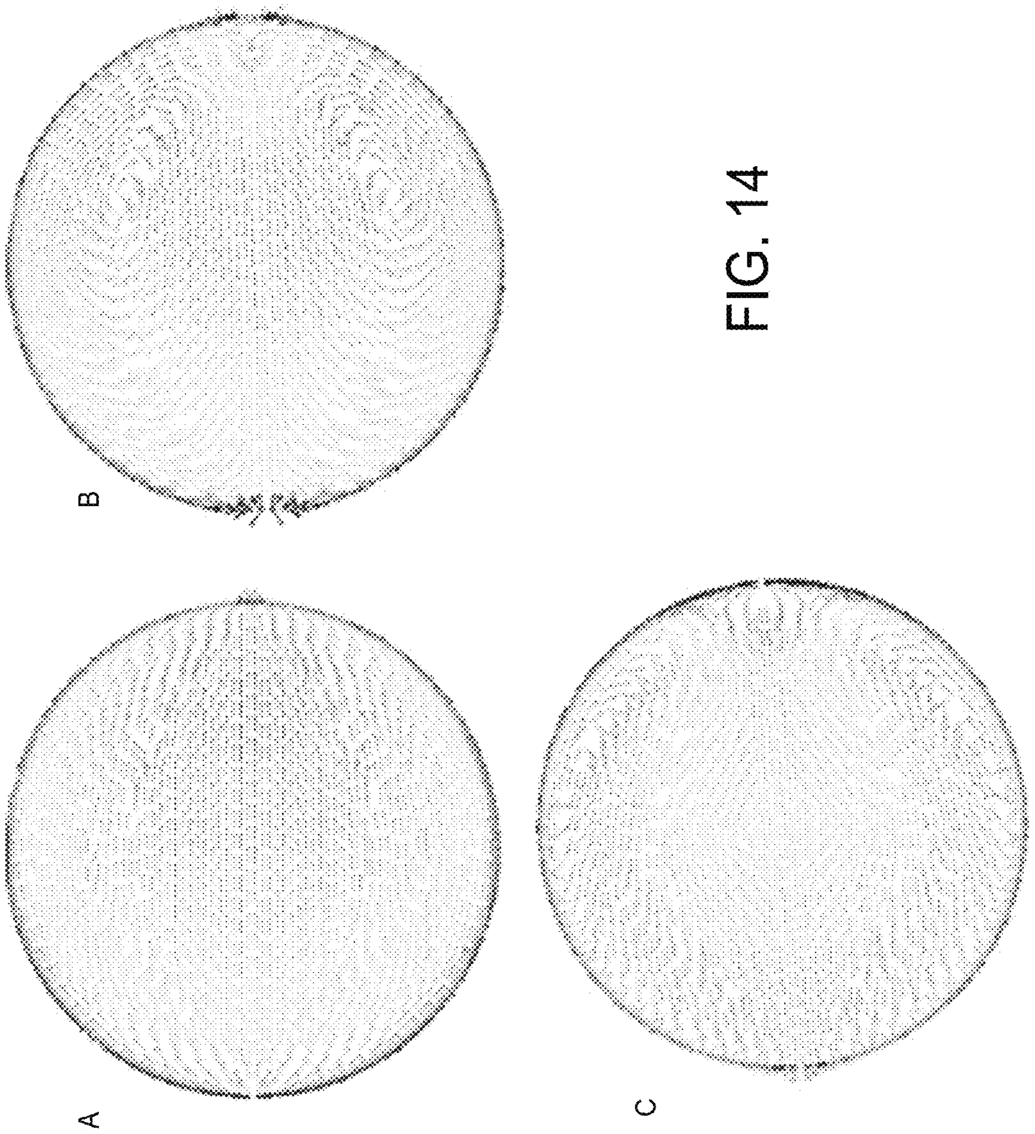
FIG. 14 shows secondary flows through a U bend in accordance with an exemplary embodiment.

The disclosed embodiments were also used to examine the flow properties of an exemplary U bend. The naming conventions used for the modeling of the 90° circular bend are shown in FIG. 12. A pipe U bend was investigated for two different radius ratios, 3.833 and 5.5, under three operating flow conditions, at Reynolds number $2.7\times10^4$, $7.3\times10^5$ and $2\times10^7$. FIG. 13A shows the flow physics for U-bend. It may be seen from the velocity profile that, as the fluid moves along the bend, maximum velocity shifts from inner side of the bend 84 to the outer side 86 (velocity magnitudes shown in axis 88). This outer higher velocity zone keeps moving with the flow even up to diameters of 12. No change in the shear stress location and magnitude was observed even when the exit length of the pipe is decreased/increased. FIG. 13B also shows the static pressure at the bend wall. Pressure at the inner wall 90 is lower than the outer wall 92 (pressures magnitudes shown in axis 94), which is an effort by the flow field to balance the centrifugal force. Boundary layer separation in region 95 is observed some distance away from the bend outlet and is captured by the model as depicted in FIG. 13C. This is because, in this region, the velocity is relatively low in the vicinity of the wall, and pressure is increasing i.e. an adverse pressure gradient has formed. FIG. 14 shows velocity vectors at cross sections labeled A, B, and C (see FIG. 13A, increasing in flow direction). It was observed that the flow is towards the outer side of the bend near to the symmetry plane. This is the result of higher centrifugal forces in this zone (low radius of curvature) as well as the tendency of the fluid to cover least distance, because fluid will try to come towards the inner radius. This creates Dean's Vortices. The area of recirculation shifts towards the inner portion of the bend as the fluid moves in the bend. This is because centrifugal forces decrease as a result of less fluid in the inner zone as the fluid moves in the bend.

Figure 15:
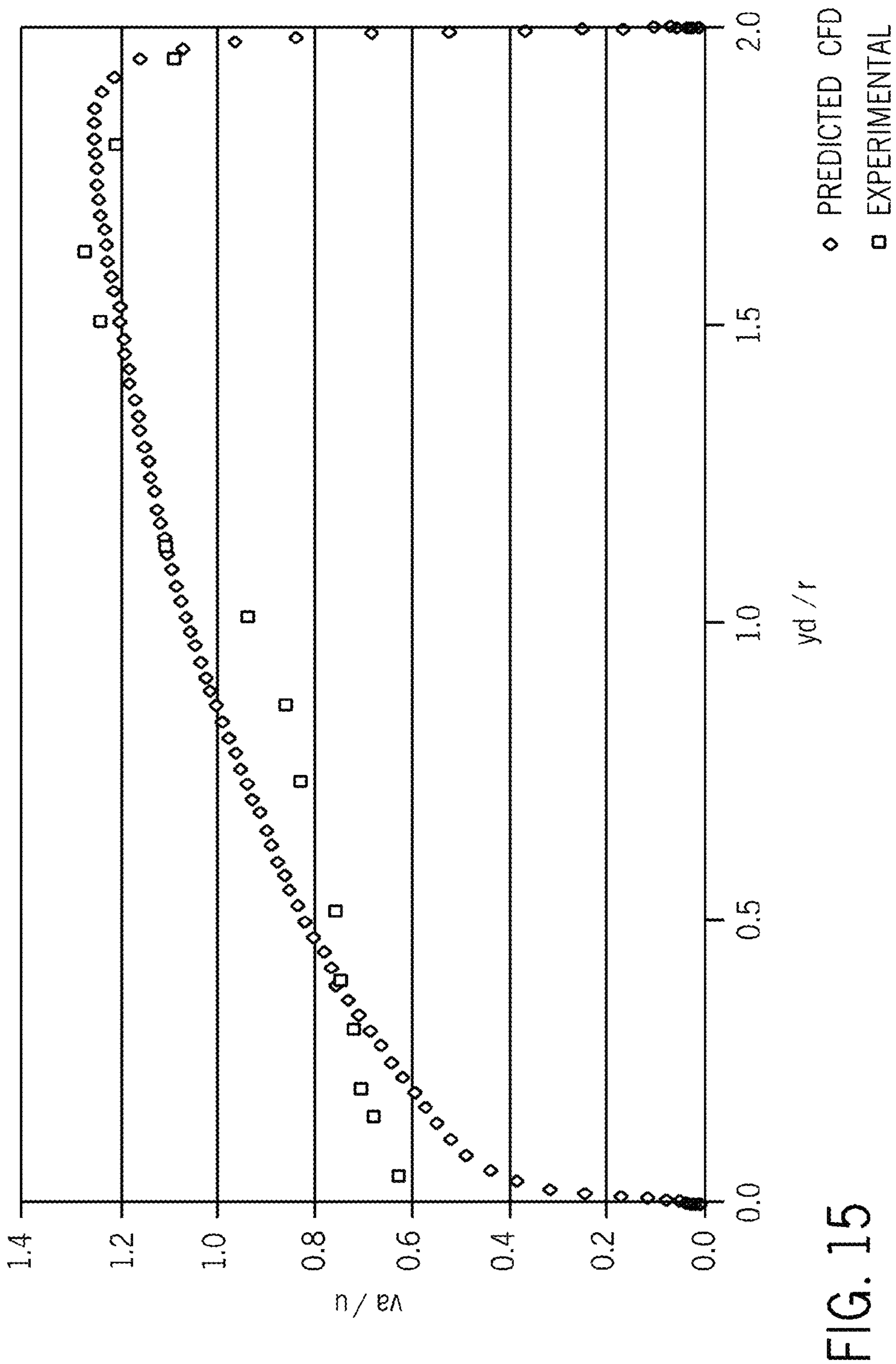
FIG. 15 is a comparison of the predicted computational velocity profile in FIG. 13A and the experimental results at one section of the exemplary U bend.

FIG. 15 is a graph of the mean axial velocity at the outlet of the bend on the symmetry plane, where 0 is the lowest radius (inner zone) and 2 is the highest radius in the outer zone of the bend. Velocities in the outer zone may be higher as a result of the centrifugal forces shifting fluid to the outer radius. The results were compared to experimental observations. It was observed that the difference between the predicted values and experimental results is within 10%. In the lower radius zone (0), the model under-estimates the value, while in the central zones it overestimates it.

Figure 16:
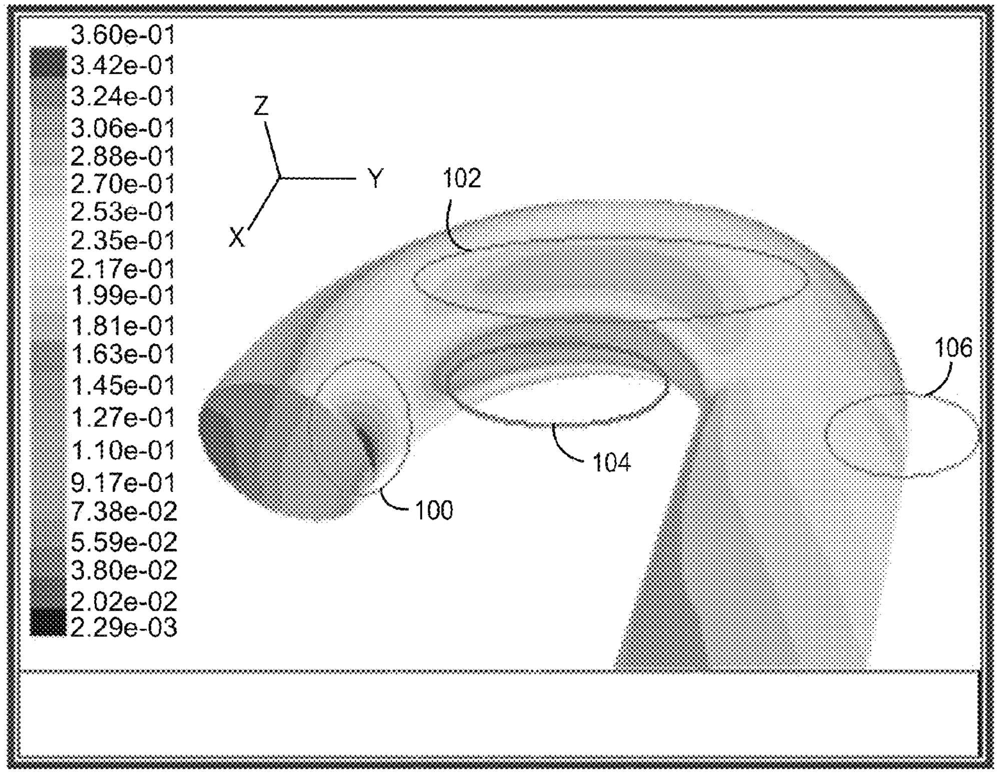
FIG. 16 is a representation of fluid dynamic modeling of the local shear stress maxima for the exemplary U bend component in accordance with an exemplary embodiment.

FIG. 16 is a schematic view of the locations of the shear stress maxima 100, 102, 104, and 106 for the U bend pipe component. It was observed that maximum value of shear stress varied with radius ratio and the Reynolds number. Four local shear maxima were seen in all the cases studied for two radius ratios and three Reynolds number. One maximum 100 is noted just after the bend inlet, which is a result of the change in primary flow gradients. One maxima 106 also occurs just after the bend and is again the result of change in primary flow. While the remaining two maxima 102 and 104 stem from a change in the secondary current and are symmetric, they are located between the outlet of the bend and centre of the bend. It has been observed that the ratio between the maxima arising out of secondary flows and primary flow varies from 0.78 to 1.12. Hence a non-dimensional transfer function is developed to predict the variation in local shear maxima magnitude and location for these three maxima.

Figure 17:
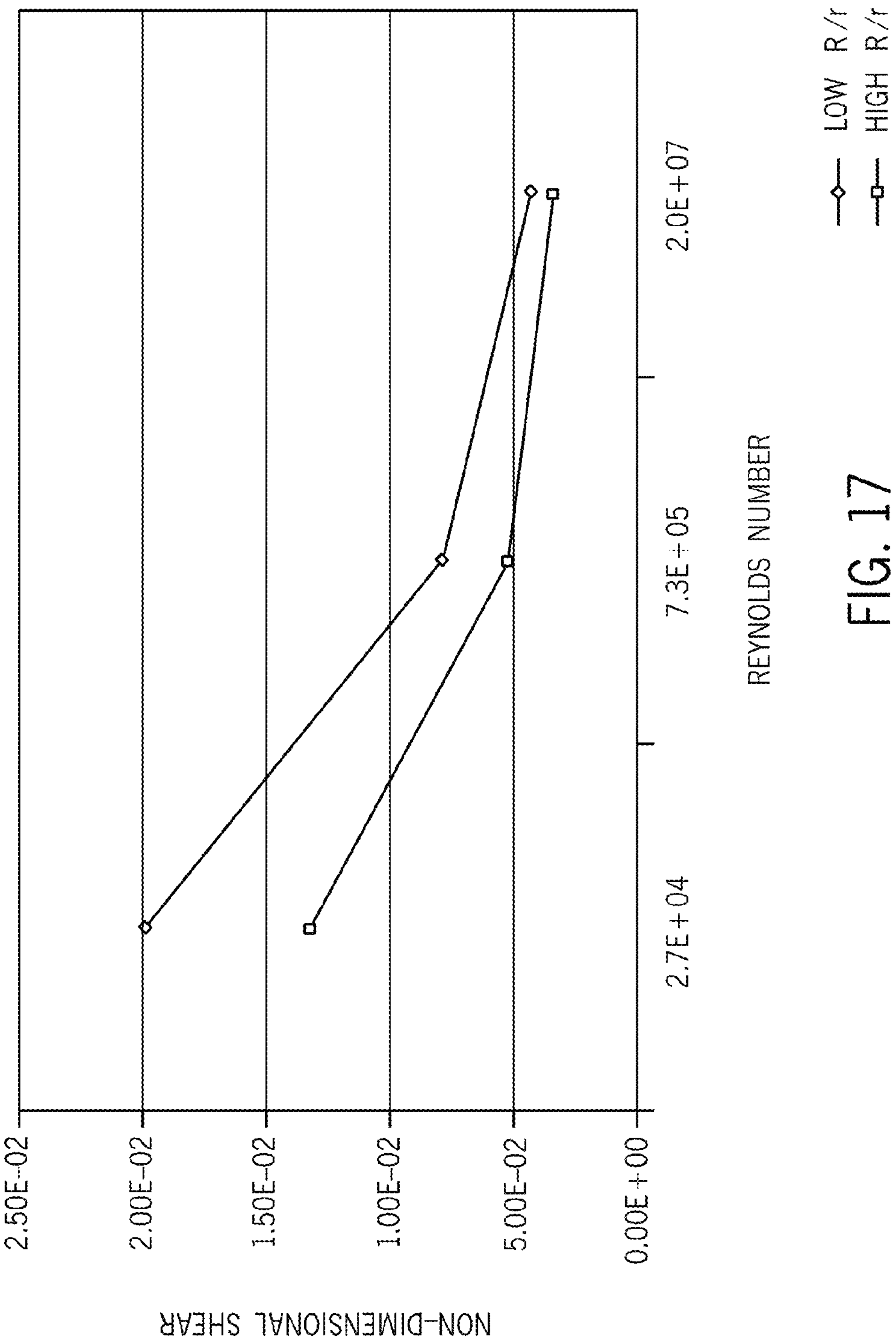
FIG. 17 shows the variation of the non-dimensional shear stress with Reynolds number and radius ratio at one shear stress maximum location for the exemplary U bend component in accordance with an exemplary embodiment.
Figure 18:
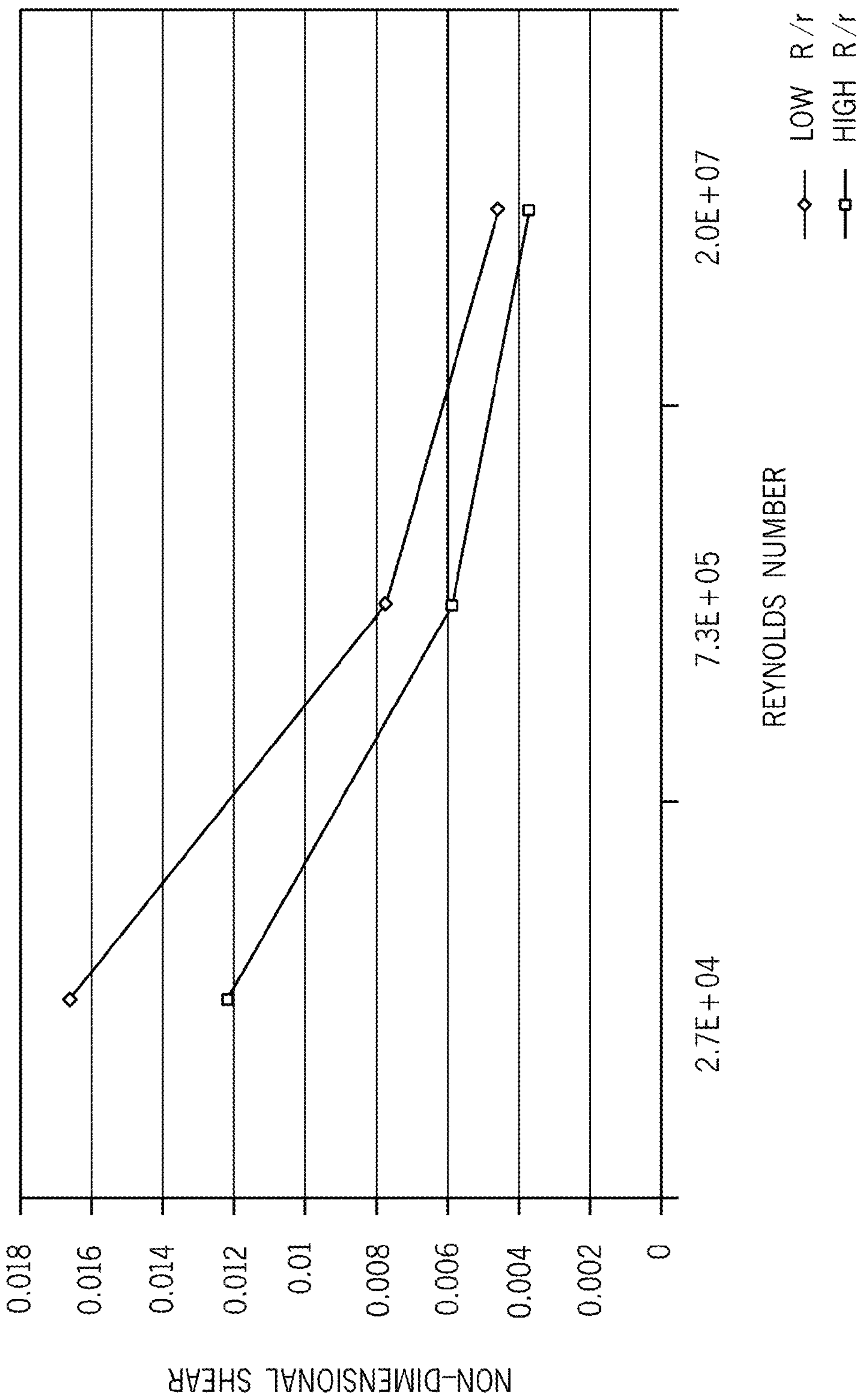
FIG. 18 shows the variation of the non-dimensional shear stress with Reynolds number and radius ratio at secondary shear stress maxima locations for the exemplary U bend component in accordance with an exemplary embodiment.

FIG. 17 is a graph that shows the variation in magnitude of local maximum non-dimensional shear stress because of primary flow (local maximal) with Reynolds number and radius ratio. As the Reynolds number is increased while keeping the radius ratio constant, the non-dimensional shear decreases. This is a result of the effect that an increase in Reynolds number means either decreasing viscous forces or increasing the convection part. It was observed that as the radius ratio is increased either by increasing the radius of curvature, which may lead to decrease in centrifugal force and then to lower shear and hence lower non-dimensional shear, decreasing the radius of pipe, or increasing the velocity for maintaining same Reynolds number, which may lead to increase in convection term and hence decrease in non-dimensional shear. Similar trends were seen even for the other local maxima, FIG. 18 shows the variation for maxima 2 & 3.

If a transfer function is fitted for these local maxima the functional form would be:

$$\tau_{iLocalMax}=a_i b_i^{r/r+R}\rho^{1+c_i}u^{2+c_i}r^{c_i}\mu^{-c_i}$$

where a, b and c for all the maxima are shown in Table 4.

TABLE 4

| Values of constants for different maxima | | | |
|---|---|---|---|
| | Max1 | Max2 & 3 | Max4 |
| a | 0.0538145 | 0.046998 | 0.09765902 |
| b | 95.66126 | 29.5552 | 3.764016 |
| c | −0.2234252 | −0.1938766 | −0.2207915 |

It was observed that location of maximum 1 in peripheral direction did not change with different parameter inputs and was observed to be 180°. While the change in flow direction follows a monotonic behavior, the variation is again well within 10% of total span. It was also observed that location of maximum 4 in peripheral direction did not change and was observed to be 0°. While the change in flow direction follows a monotonic behavior, the variation is again well within a small percentage of the span. It was observed that locations of maxima 2 & 3 in the peripheral direction did not change and was observed to be 130°±10°. It was seen that, if the intersection of the span covered by maximum to 0.9 maximum was studied, the span formed a streak. The streak varied, from 7° to 35° for all the cases. For selecting a monitoring point, any point within the streak may be monitored. These locations are tabulated in Table 5.

TABLE 5

| Location of Local Maxima for U-bend | | | | |
|---|---|---|---|---|
| | Max1 | Max2 | Max3 | Max4 |
| $\theta_1$ (in degree) | −90 to −74 | 7 to 35 | 7 to 35 | Not Required |
| $\theta_2$ (in degree) | 180 | 120 to 140 | −120 to −140 | 0 |
| x/d | Not Required | Not Required | Not Required | 0.23 to 0.27 |

Accordingly, a modular component with the geometric characteristics of a U bend, or a similar shape, may be modeled with a non-dimensional transfer equation. Certain geometric parameters, as well as operating and fluid parameters, may be used to locate or predict local shear stress maxima for this component.

II. Flow Properties of a Tee Junction

Figure 19:
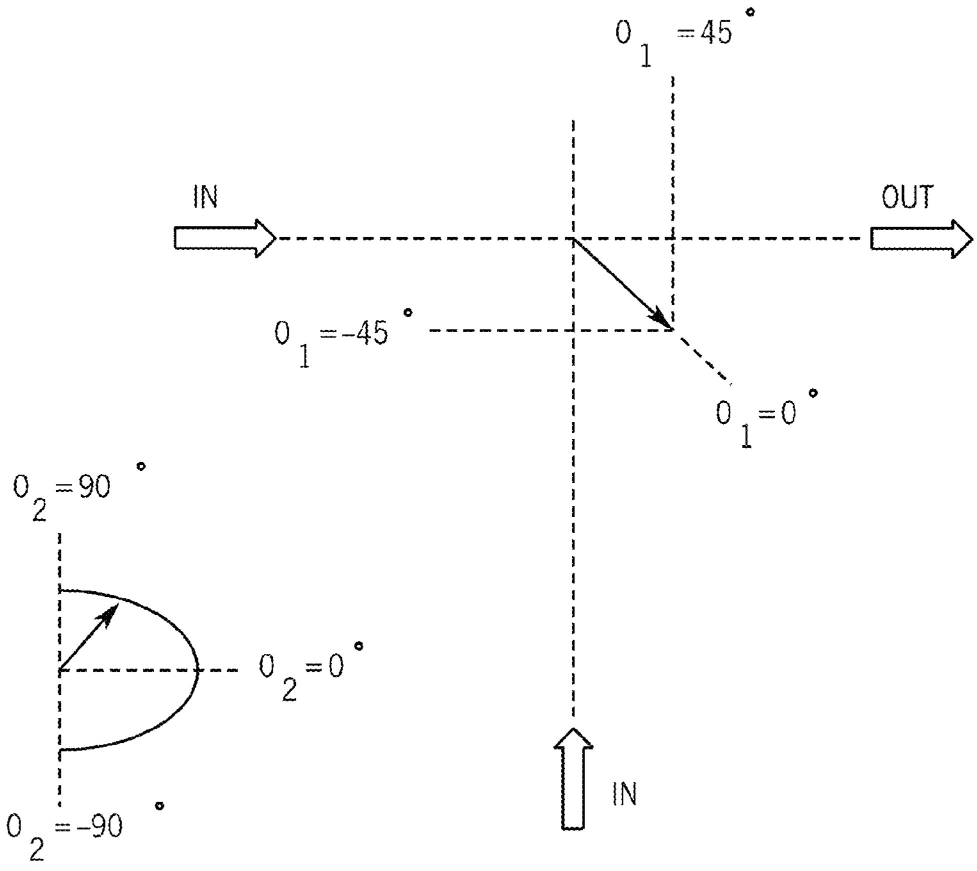
FIG. 19 shows exemplary naming conventions for modeling an exemplary tee junction in accordance with an exemplary embodiment.
Figure 20A:
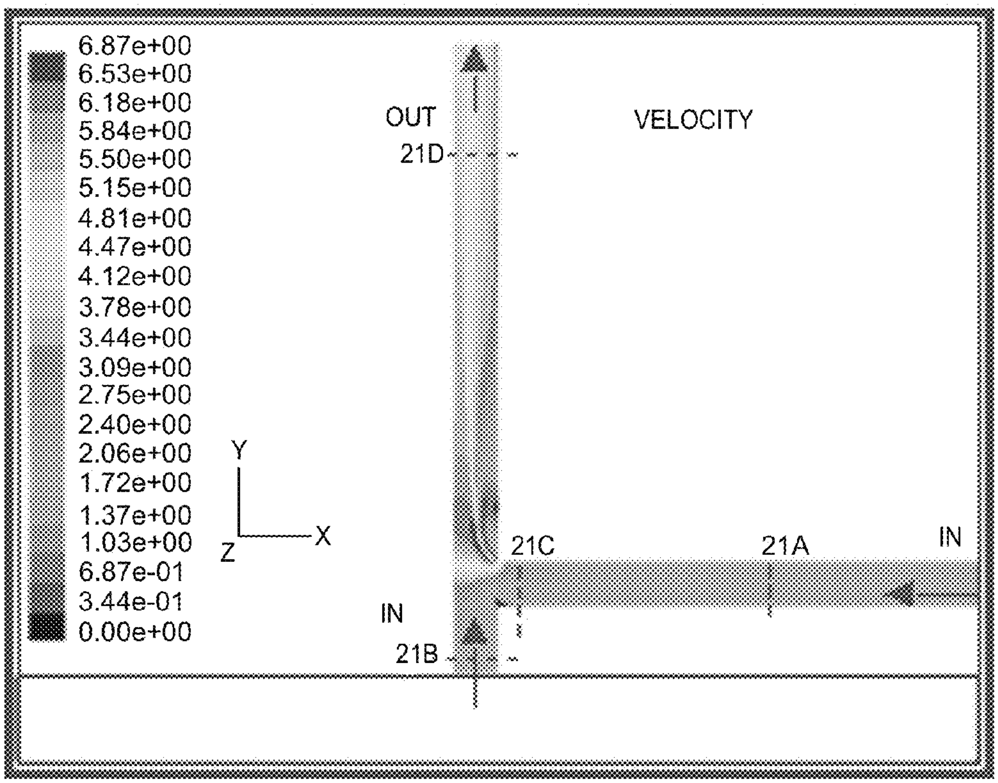
FIG. 20A shows an exemplary fluid velocity profile through a tee junction in accordance with an exemplary embodiment.
Figure 20B:
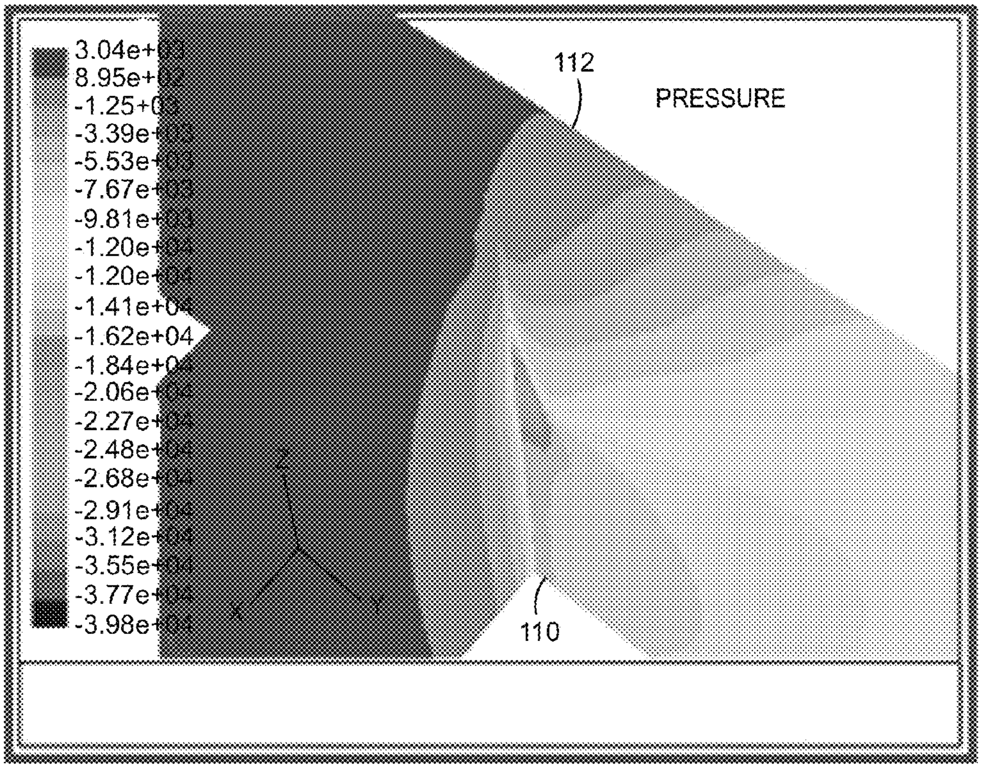
FIG. 20B shows an exemplary pressure profile through a tee junction in accordance with an exemplary embodiment.
Figure 20C:
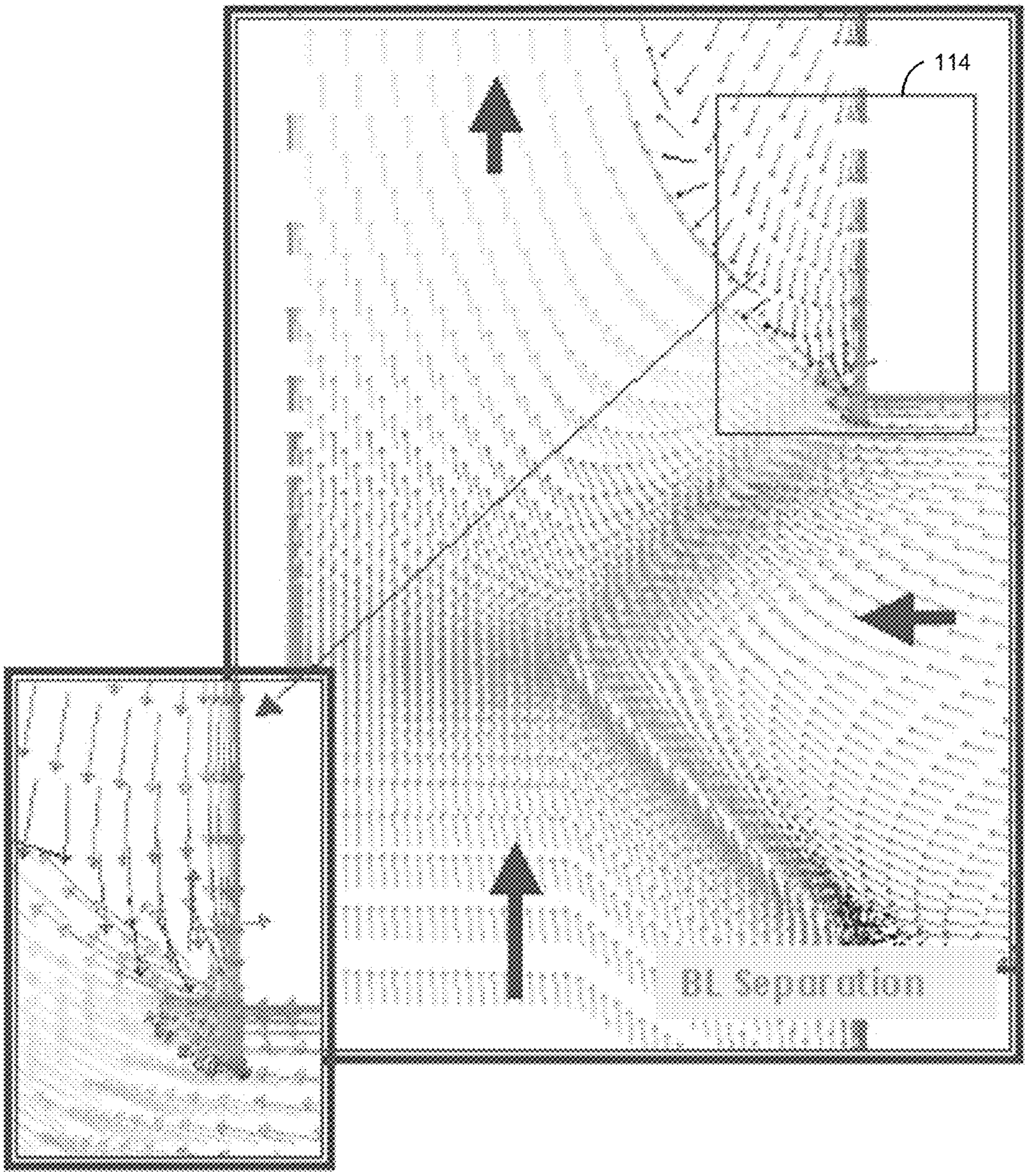
FIG. 20C shows an exemplary boundary layer separation profile through a tee junction in accordance with an exemplary embodiment.
Figure 21:
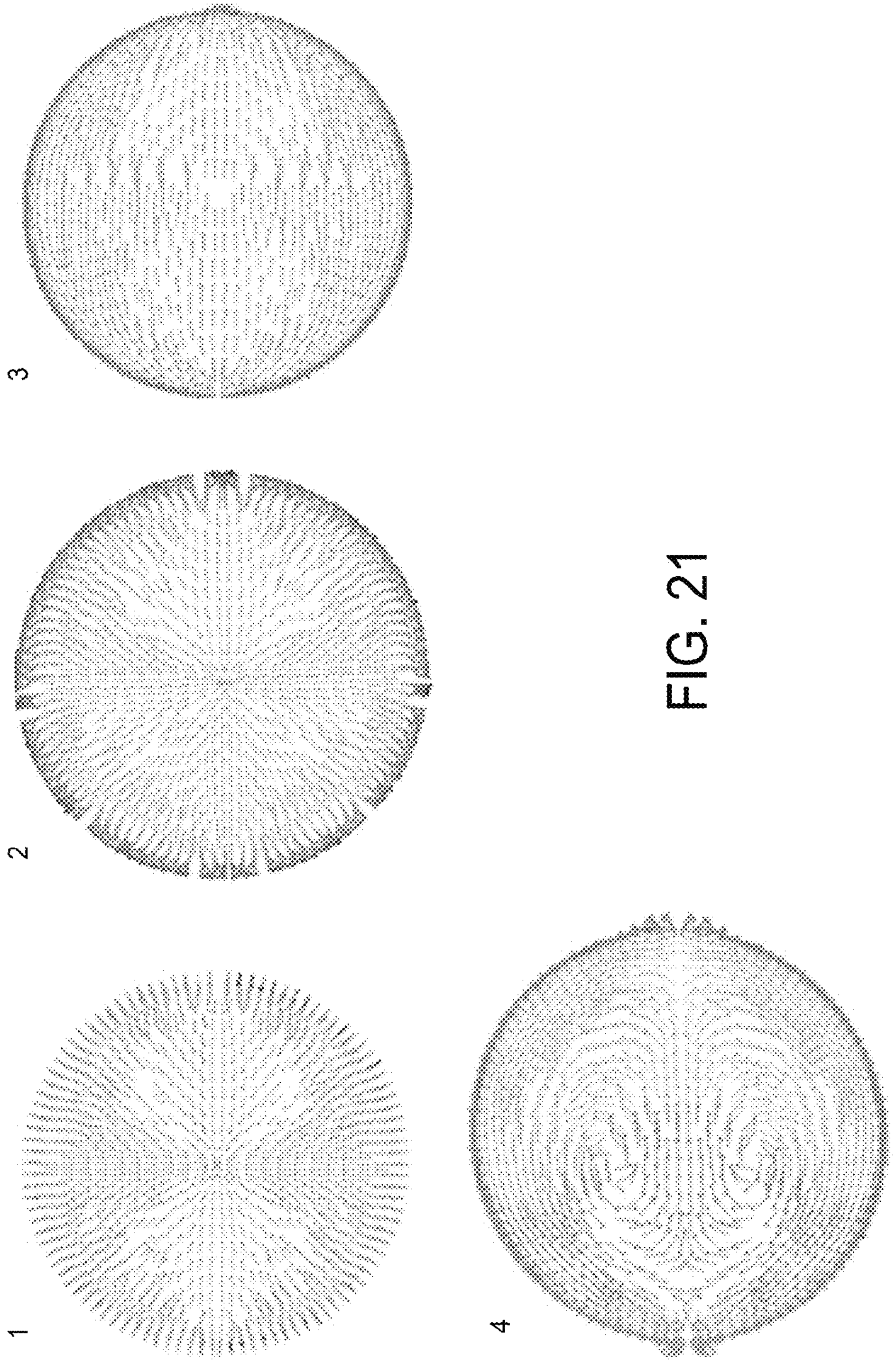
FIG. 21 shows secondary flows through a tee junction in accordance with an exemplary embodiment.

The disclosed embodiments were also used to examine the flow properties of an exemplary tee junction. The naming conventions used for the modeling of the tee junction are shown in FIG. 19. A tee junction was studied for three operating conditions, at Reynolds number $2.7\times10^4$, $7.3\times10^5$ and $2\times10^7$. FIG. 20A shows the velocity profile and vector plot on the symmetry plane capturing the boundary layer separation and pressure distribution at the junction. From the velocity profile, it was observed that the flow takes a turn in a similar manner as the U-bend and circular bend, but with a sharper degree. The flow tends to project outward due to relatively high centrifugal forces. As seen in FIG. 20B, static pressure at the inner wall 110 is lower than the outer wall 112 to balance this centrifugal force. FIG. 20C shows boundary layer separation in region 114, which is located just after the corner of the tee junction. In the corner region, an adverse pressure gradient leads to the boundary layer separation. FIG. 21 is a graph that shows velocity vectors on cross sections labeled 1 to 4. It was observed that at sections A and B, flow is towards the centre, which indicates smooth boundary layer development, while in section C, just upstream of the corner, there is a tendency of the fluid to adjust itself for an imminent separation. Secondary flow currents along with circulatory motions are found in section D, downstream of the separation bubble at the corner.

Figure 22:
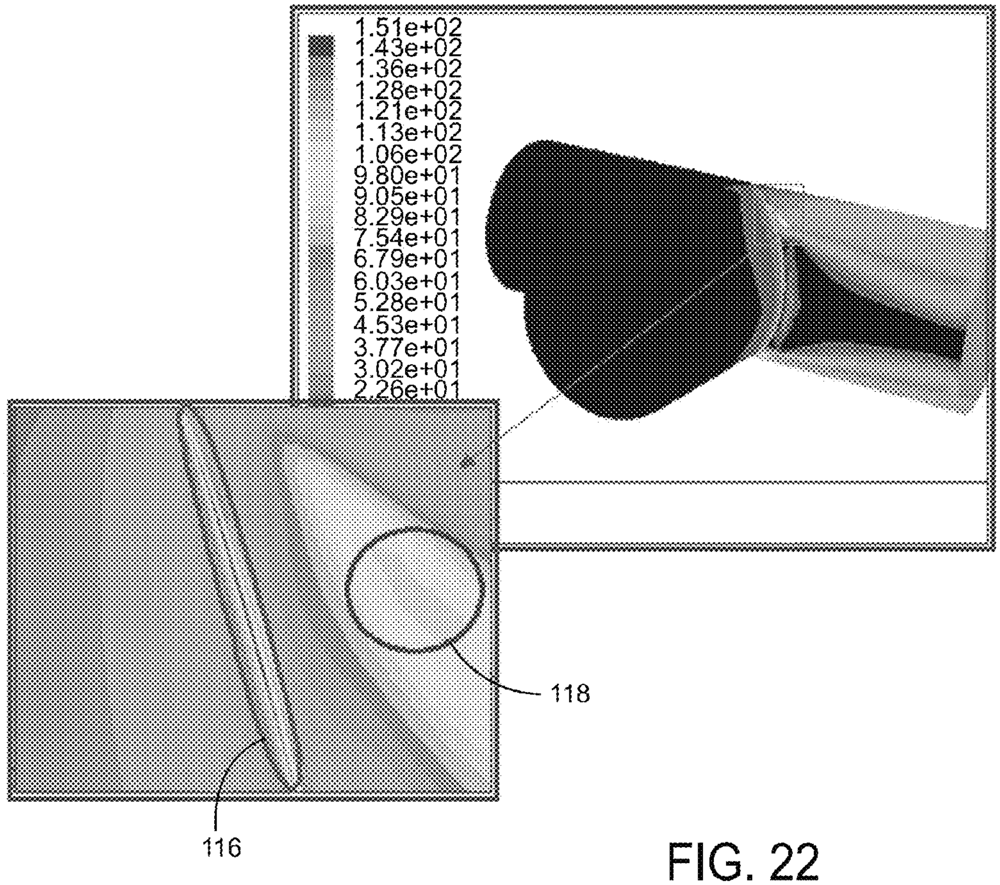
FIG. 22 is a representation of fluid dynamic modeling of the local shear stress maxima for the exemplary tee junction component in accordance with an exemplary embodiment.

FIG. 22 is a schematic view of two local shear stress maxima 116 and 118 for the modeled tee junction. The maximum value of shear stress was observed to be strongly dependent on Reynolds number. Four local shear stress maxima are seen in all the cases studied for three different Reynolds number. Two local maxima 116 and 118, shown in FIG. 22, are observed just at the corner, which arises due to combined effects of sudden change in velocity direction and secondary currents. The other two maxima (not shown) are the result of a change in the secondary current and are symmetric, located just after the corner on the top surface. It was observed that the ratio between the maxima arising out of secondary flows and primary flow varied from 1.66 to 3.55. The secondary maxima were lower in magnitude compared to the primary maxima, however its confidence value was higher. In embodiments in which the corner might not be as sharp, the secondary maxima may increase significantly in magnitude.

Figure 23:
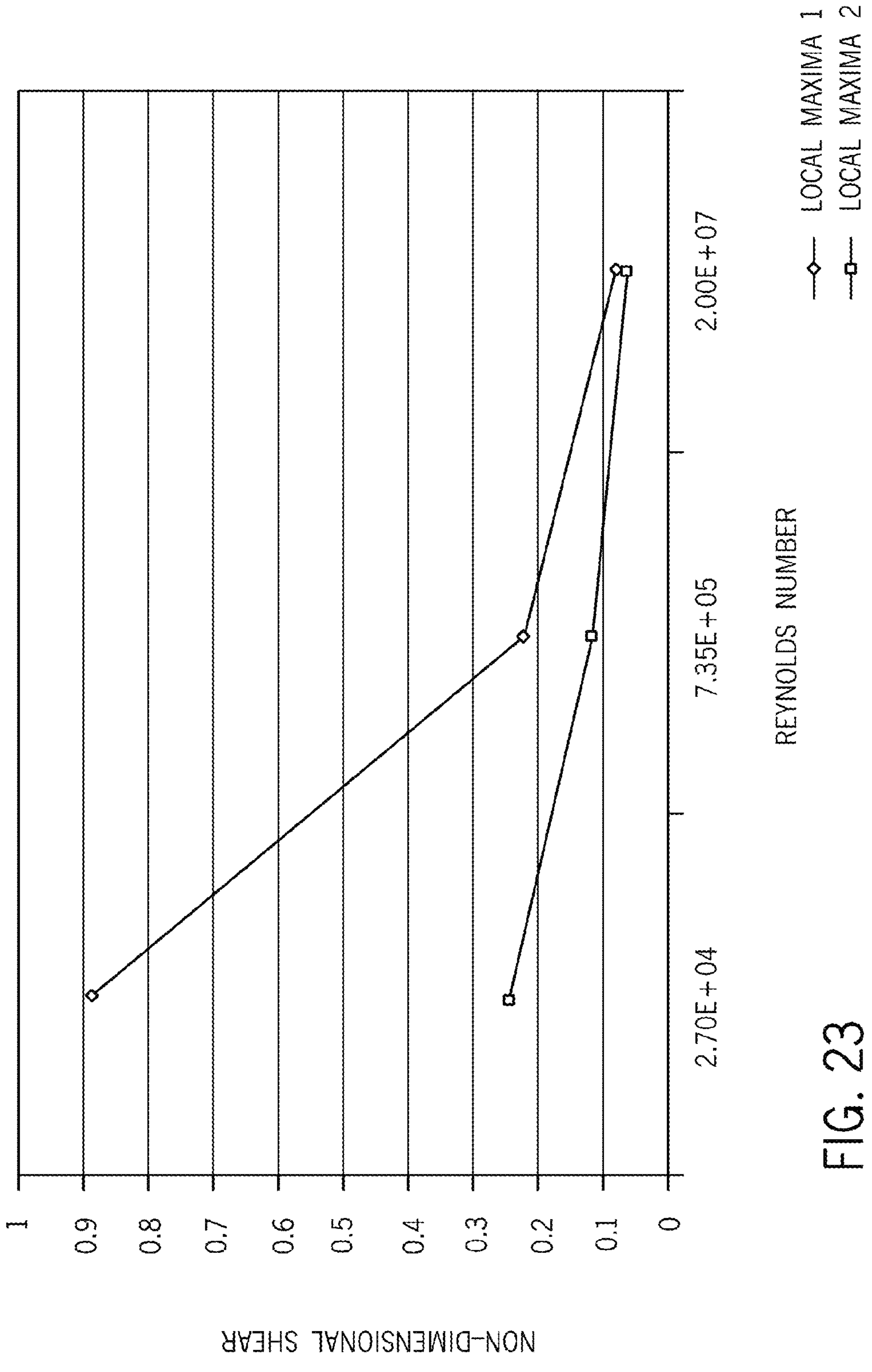
FIG. 23 shows the variation of the non-dimensional shear stress with Reynolds number at one shear stress maximum location for the exemplary tee junction component in accordance with an exemplary embodiment.

FIG. 23 is a graph shows the variation in magnitude of local maximum non-dimensional shear stress for local maxima 1 and 2. It was observed that, as Reynolds number is increased, non-dimensional shear stress decreases. This is due to the fact that an increase in Reynolds number indicates either decreasing viscous forces or an increase in convection part which leads to increase in shear but a much higher increase in convection.

A transfer function is developed for these local maxima given by:

$$\tau_{iLocalMax}=a_i\rho^{1+c_i}u^{2+c_i}r^{c_i}\mu^{-c_i}$$

where i indicates the maxima number, and values of these constant corresponding to these maxima is shown in Table 6 below.

TABLE 6

| Values of constant for shear maxima for Tee-junction | | |
|---|---|---|
| | Max1 & 3 | Max2 & 4 |
| a | 12.32686025 | 0.732749809 |
| c | −0.356734305 | −0.2006663 |

It was observed that the location of these maxima did not change with operating conditions and covered a span that is shown in Table 7 below.

TABLE 7

| Location of local shear maxima for a tee junction | | | | |
|---|---|---|---|---|
| | Max1 | Max2 | Max3 | Max4 |
| $\theta_1$(in degree) | 0 | 3.5 | 0 | 3.5 |
| $\theta_2$ (in degree) | 34 to 47 | 42 | −34 to −47 | −42 |

Figure 24:
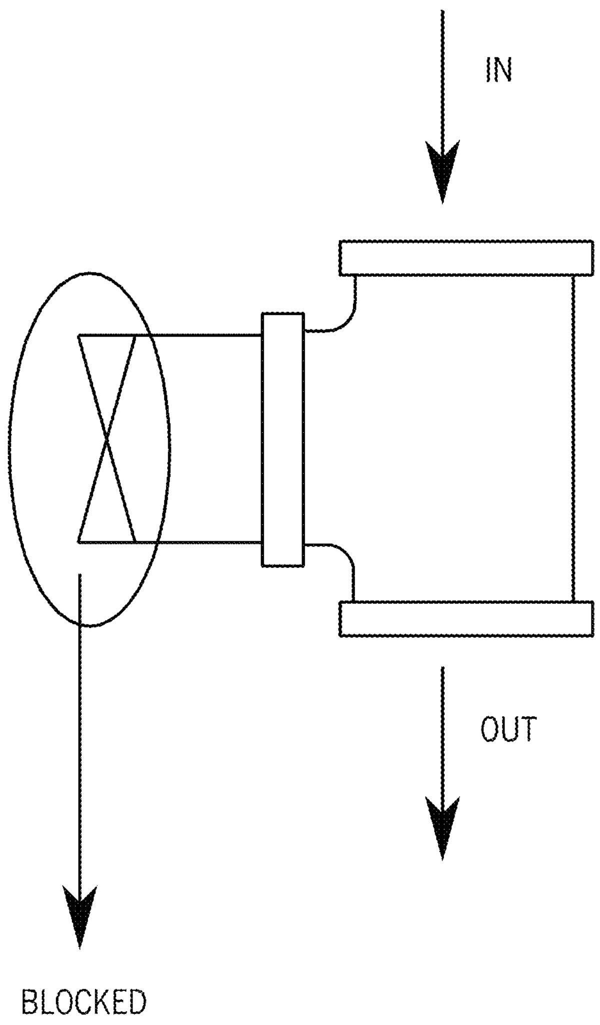
FIG. 24 shows an exemplary blocked tee configuration in accordance with an exemplary embodiment.
Figure 25:
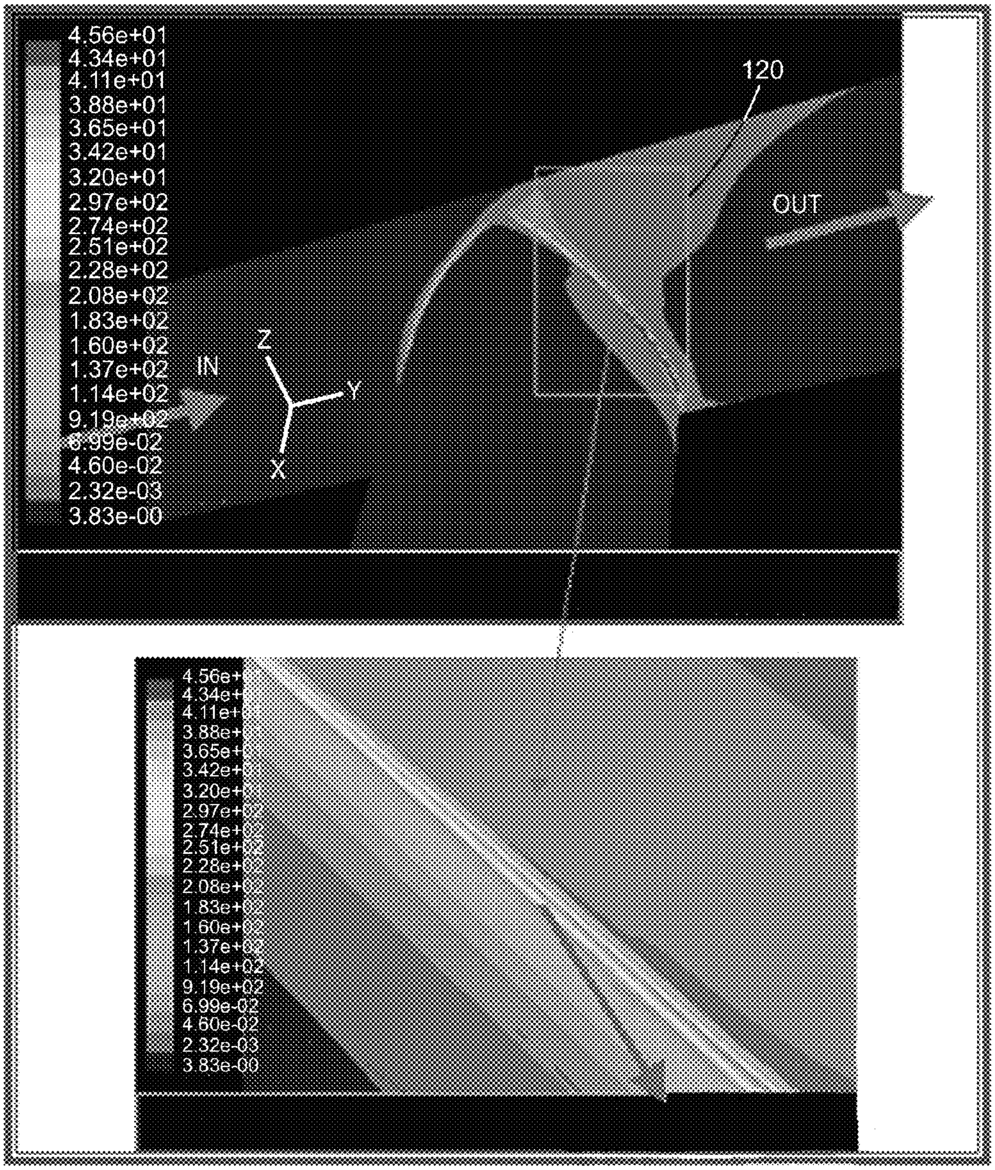
FIG. 25 is a representation of fluid dynamic modeling of the local shear stress maxima for the exemplary blocked tee junction component in accordance with an exemplary embodiment.

One of the other most commonly found flow configurations, a blocked tee, in refineries is shown in FIG. 24. A blocked tee is commonly found at locations where control valves are placed to control the flow distribution. In addition to Reynolds number, blocked tube length may be another parameter influencing the location & magnitude of shear stresses on the walls of the tee junction. The minimum “blocked” length observed in refineries may be modeled as having a length of at least 2d. In a blocked tee, the location of shear stress may be at the downstream corner of tee junction as is shown in FIG. 25. In this embodiment, only one local shear maxima 120 was observed. It was also observed that shear stress in the blocked tee was ⅛ less than the shear stress in a tee junction under normal operating conditions (i.e., open flow). The blocked tee has insignificant (<10%) changes in shear stress magnitude with changes in length of the blocked portion, while for location no change is observed for different blockage lengths.

Figure 26:
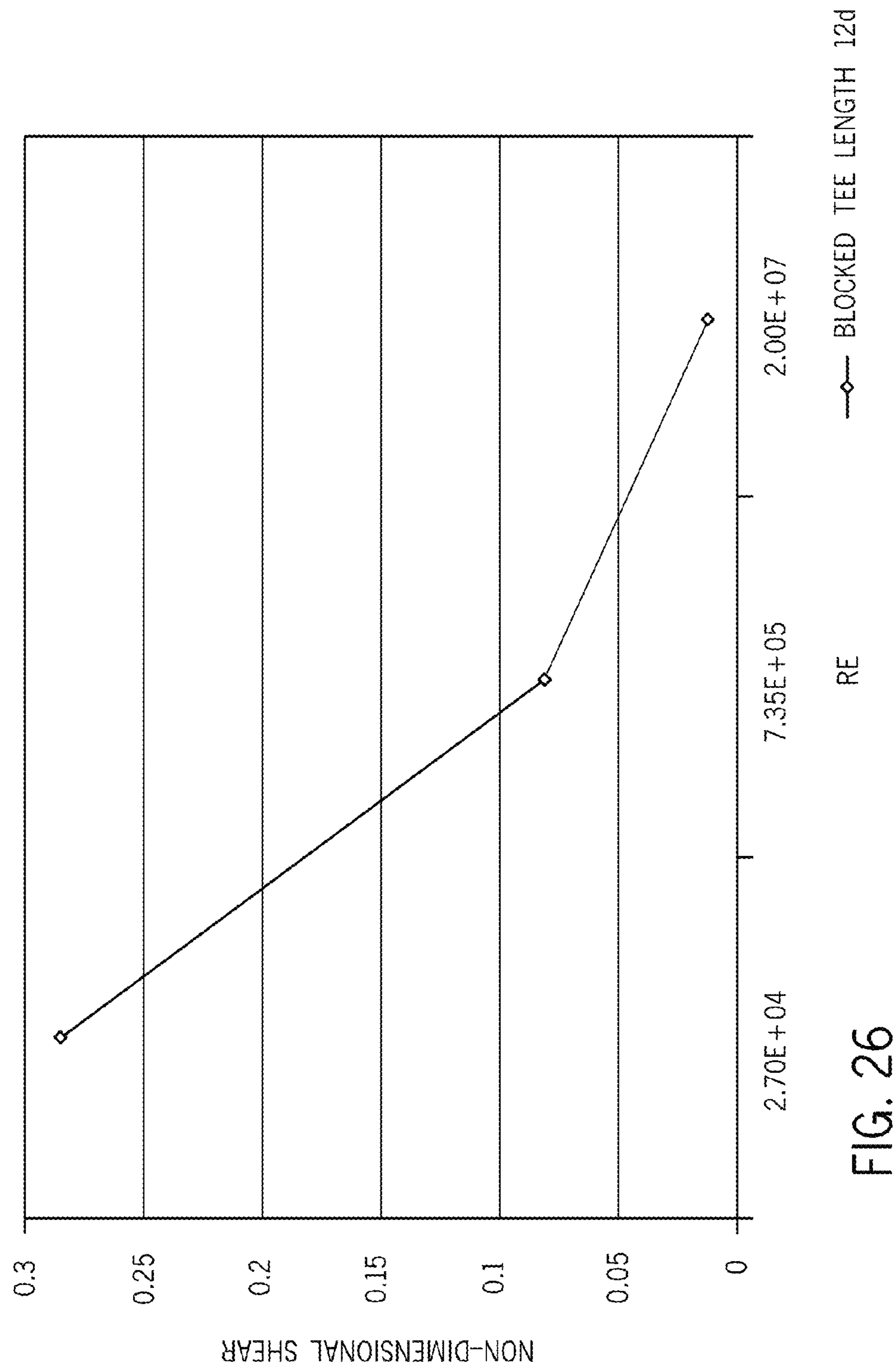
FIG. 26 shows the variation of the non-dimensional shear stress with Reynolds number at one shear stress maximum location for the exemplary blocked tee junction component in accordance with an exemplary embodiment.

FIG. 26 shows the variation of non-dimensional shear stress with Reynolds number, the relationship given by:

$$\tau=a\rho^{1+c}u^{2+c}r^{c}\mu^{-c}$$

where values of constants a and c are tabulated in Table 8.

TABLE 8

| Values of constants for shear maxima transfer function for a blocked tee | |
|---|---|
| | Local Maxima |
| a | 14.907 |
| c | −0.4775572 |

Accordingly, a modular component with the geometric characteristics of a tee junction, or a similar shape, may be modeled with a non-dimensional transfer equation. In addition, tee junctions that are blocked at an inlet or outlet may also be modeled. Certain geometric parameters, as well as operating and fluid parameters, may be used to locate or predict local shear stress maxima for this component.

IV. Flow Properties of a Reducer

Figure 27:
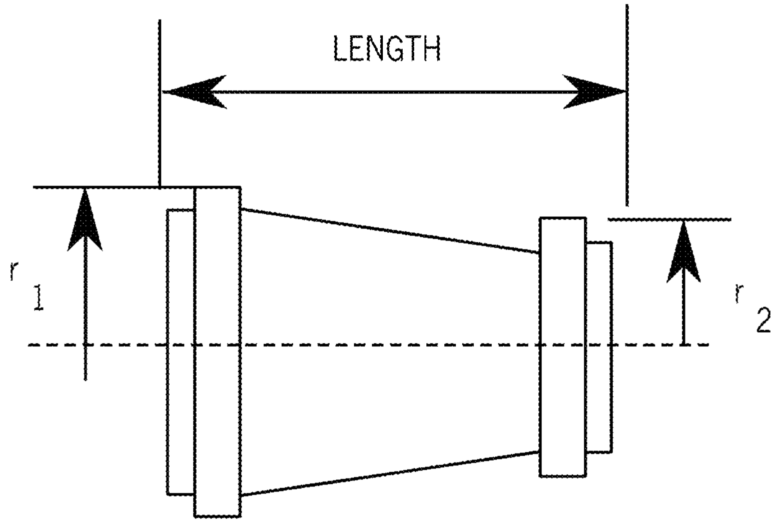
FIG. 27 shows exemplary naming conventions for modeling an reducer in accordance with an exemplary embodiment.

The disclosed embodiments were also used to examine the flow properties of an exemplary reducer. The naming conventions used for the modeling of the tee junction are shown in FIG. 27. The reducer was studied under Reynolds numbers $2.7\times10^4$, $7.3\times10^5$ and $2\times10^7$, and for two slopes, 0.023 and 0.089, where the slope is given $$\text{by} = \text{slope} = \frac{(r_1 - r_2)}{\text{Length}}.$$

Figure 28:
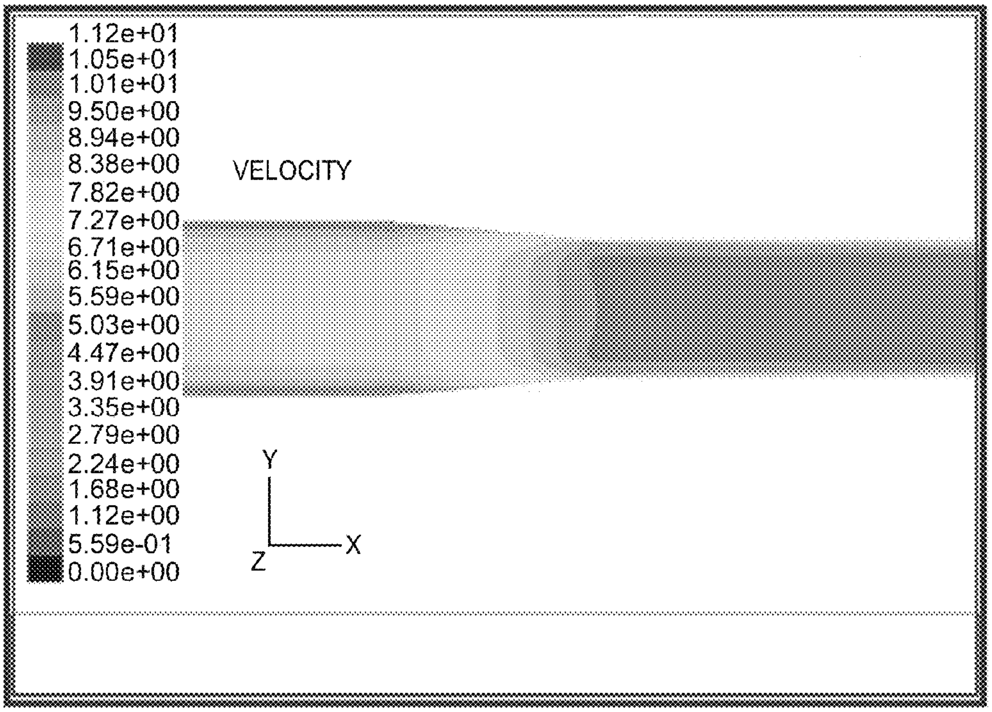
FIG. 28 shows an exemplary fluid velocity profile through a reducer in accordance with an exemplary embodiment.

FIG. 28 shows the velocity profile at the symmetry plane. From the velocity profile it may be observed that, as the fluid enters in the reducer, average fluid velocity increases due to decrease in cross sectional area, which gives rise to increase in local velocities too.

Figure 29:
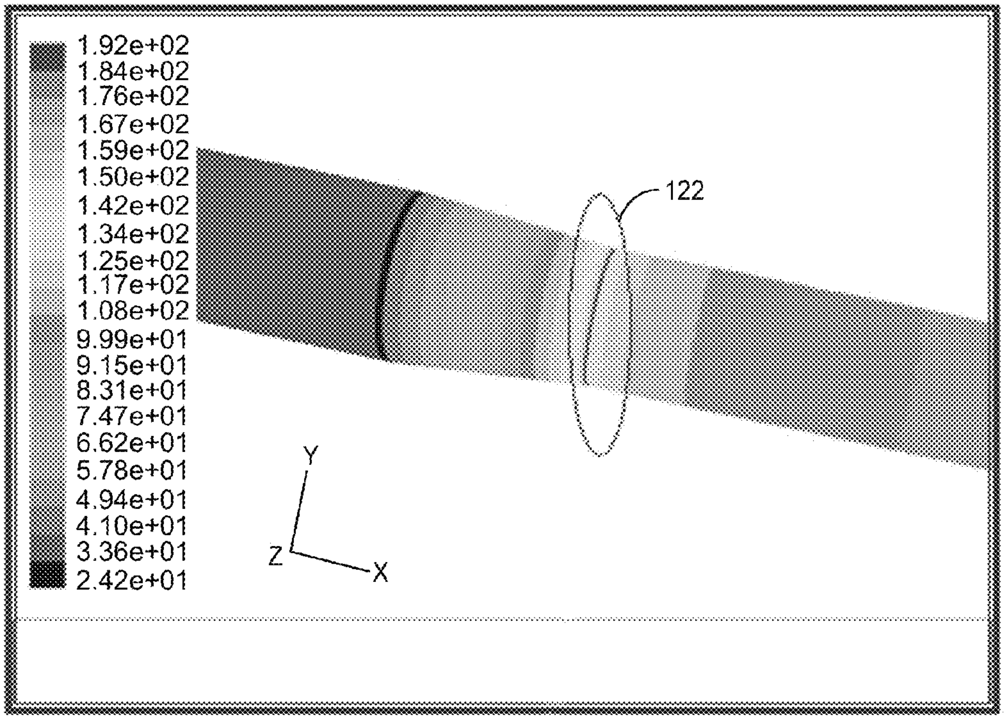
FIG. 29 is a representation of fluid dynamic modeling of the local shear stress maxima for the exemplary reducer component in accordance with an exemplary embodiment.

Maximum shear stress was observed to be at the outlet of the reducer. This may be the result of velocities being higher in the lowest diameter pipe section while the outlet of the reducer flow may be in a developing zone of flow. Maximum shear stress was a strong function of Reynolds number (on the basis of outlet diameter of reducer) and slope of reducer. Maximum shear stress 122 is observed at the outlet of the bend, shown in the schematic of FIG. 29.

Figure 30:
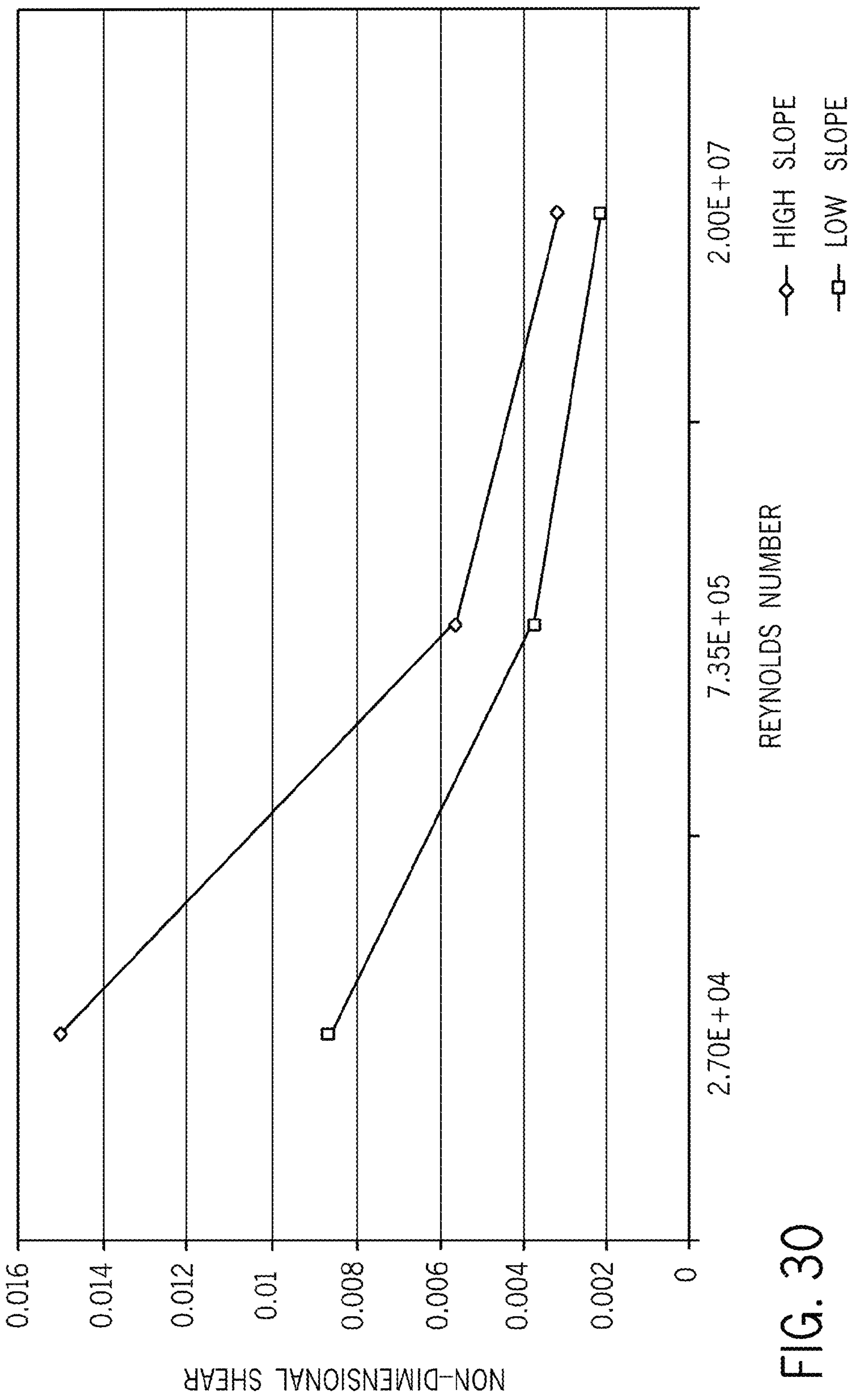
FIG. 30 shows the variation of the non-dimensional shear stress with Reynolds number and slope at the shear stress maximum location for the exemplary tee junction component in accordance with an exemplary embodiment.

FIG. 30 is a graph that shows the variation with Reynolds number in magnitude of local maximum non-dimensional shear stress for local maxima 1 and 2. It was observed that, as Reynolds number increased, non-dimensional shear stress decreased. It was also observed that higher slope related to higher shear stress.

A transfer function is developed for these local maxima given by:

$$\tau_{LocalMax}=ab^{100(r_1-r_2)/Length}\rho^{1+c}u^{2+c}r_1^{2}r_2^{c-2}\mu^{-c}$$

Values of these constants are in Table 9.

TABLE 9

| Values of constant for shear maxima | |
|---|---|
| | Max |
| a | 0.0318 |
| b | 1.0709 |
| c | −0.227 |

It was observed that location of these maxima in all the cases studied was at the exit of the reducer.

Accordingly, a modular component with the geometric characteristics of a reducer, or a similar shape, may be modeled with a non-dimensional transfer equation. Certain geometric parameters, as well as operating and fluid parameters, may be used to locate or predict local shear stress maxima for this component.

V. Interaction Between the Components

Figure 31C:
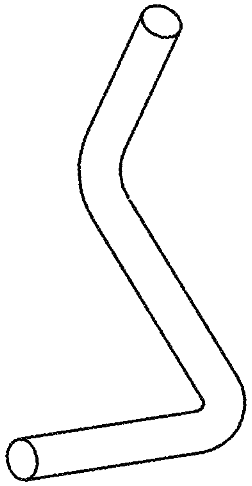
FIG. 31C shows an alternative combination circular bend that may be modeled in accordance with an exemplary embodiment.
Figure 31B:
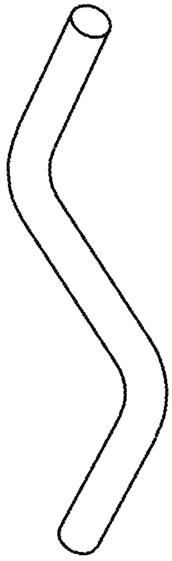
FIG. 31B shows an alternative combination circular bend that may be modeled in accordance with an exemplary embodiment.
Figure 31A:
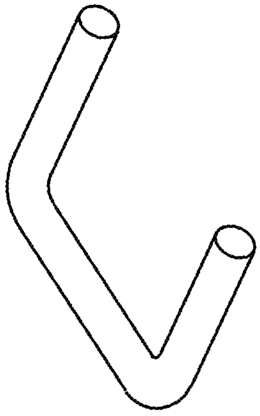
FIG. 31A shows an exemplary combination circular bend that may be modeled in accordance with an exemplary embodiment.

In addition to modeling shear stress in individual components, the disclosed embodiments may also take into account the interaction between the components. For example, the interaction between different 90° circular bends was studied under a range of operating conditions. Three common configurations for circular-to-circular bend combinations are shown in FIGS. 31A-C. In such configurations, flows through these components have very high inertia forces and gravity effects may be insignificant. Accordingly, the relative orientation matters more than absolute orientation.

In addition, the shear stress difference may be studied in a downstream or upstream manner. In looking at downstream effects, the difference between shear stresses in the bends was analyzed for an exemplary highest Reynolds number and low radius of curvature with zero interaction length. For example, the combination with cross orientation in FIG. 31C showed a 27% difference in shear stress magnitude between components. Turning to upstream effects, if a percentage change in shear stress in a bend is observed, it is found that the a difference of 10% or less may be considered insignificant. It was generally observed that, though upstream effects were not significant, downstream effects were considerably high. Table 10 shows the percentage difference for the combinations.

TABLE 10

| Upstream effects | | | | |
|---|---|---|---|---|
| Configuration | Re | Maximum Non-Dimensional shear Magnitude | % Difference Compared with just a single bend case with no bend upstream or downstream | Change in Location |
| FIG. 31A | High | 0.004498 | 8 | Insignificant |
| FIG. 31B | High | 0.004415 | 6 | Insignificant |
| FIG. 31C | High | 0.004312 | 4 | Insignificant |

Figure 32:
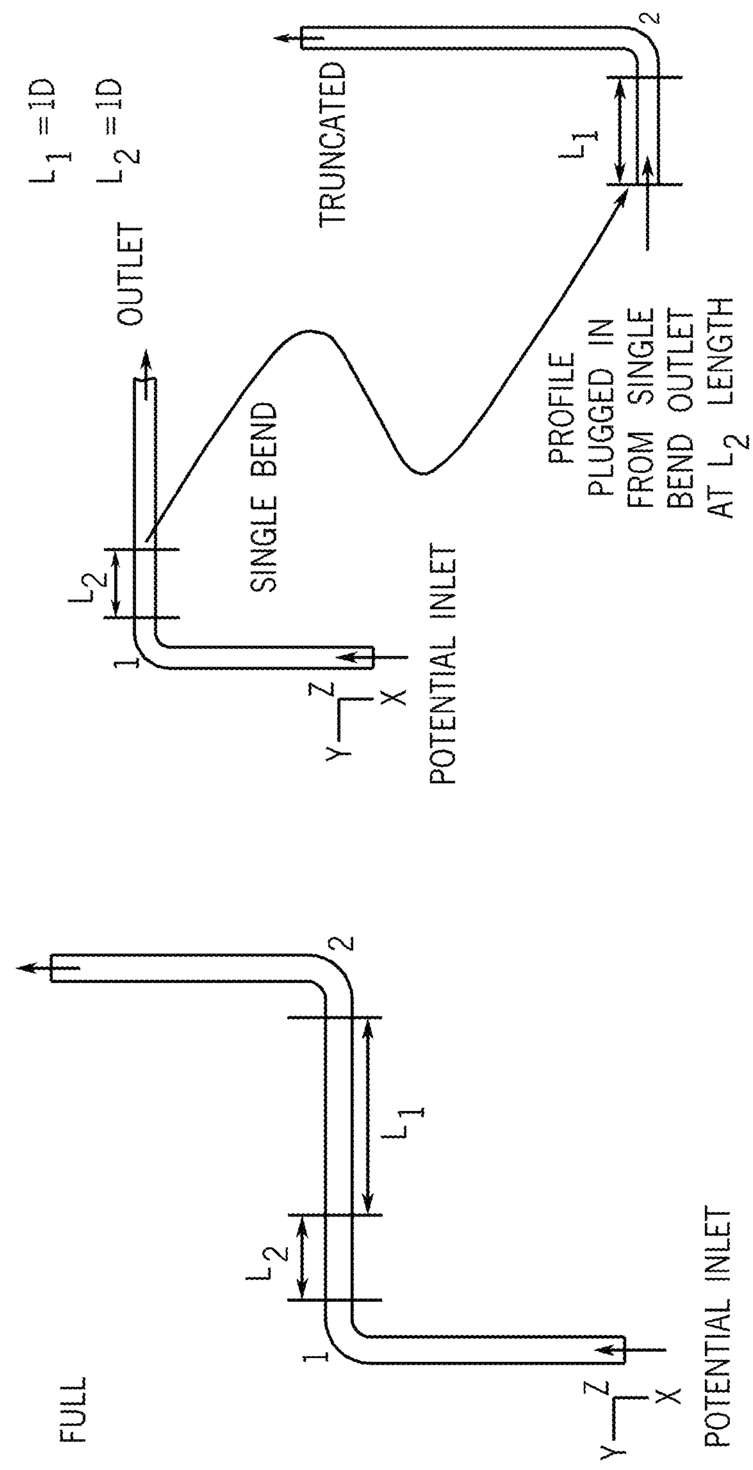
FIG. 32 shows a schematic of a truncated approach to studying pipe component combinations in accordance with an exemplary embodiment.

As having two bends and entry length and exit length increases the computational domain and the computational efforts, an approach may be adopted in which the exit profile from the single bend studies after 1D length from the bend are taken in as inlet profile for the next bend. To address the relative orientation, these profiles were rotated at appropriate angles. In this approach, a validation was done to check range of validity. These combinations were studied at an interaction length of 2d, and are compared with a case with 1D entry length where the inlet profile from the single bend studies is plugged in after 1D length from the bend exit. These cases are shown in FIG. 32.

TABLE 11

| Difference in shear stress of full case with truncated one | | | | | |
|---|---|---|---|---|---|
| | | Maximum Non-Dimensional Shear Magnitude | | | |
| Configuration | Re | Full Combination | Truncated Case | % Difference | Change in Location |
| FIG. 31A | High | 0.005070 | 0.004963 | −2 | Insignificant Change (<2°) |
| FIG. 31B | High | 0.005353 | 0.005655 | 6 | Insignificant Change (<2°) |
| FIG. 31C | High | 0.005502 | 0.005475 | −1 | Insignificant Change (<2°) |

Figure 33:
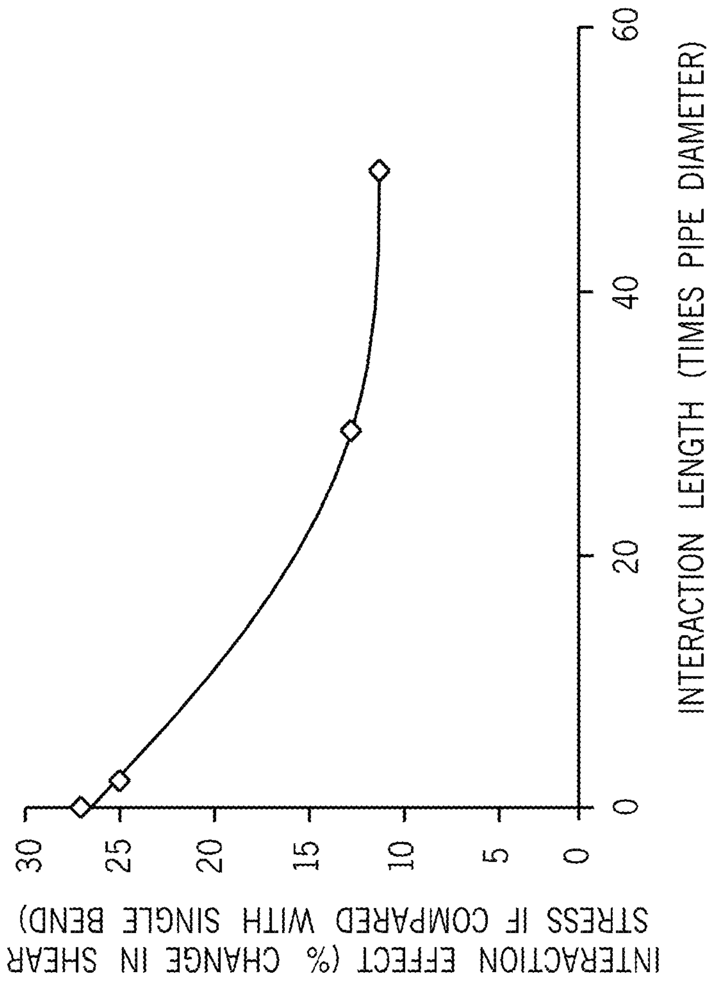
FIG. 33 shows the effect of interaction length of pipe components with shear stress as compared to individual components in accordance with an exemplary embodiment.

Table 11 shows the variation of percentage change in shear stress at the second of the three bends in the combinations due to truncation. It was found that the change in magnitude and location was insignificant (<10%). Accordingly, the approach of truncating introduces insignificant error and may be used as an effective modeling technique. As the interaction length between the components may influence the velocity profile of the flow into the next component, it may be advantageous to study its effect. FIG. 33 shows the effect of interaction length on non-dimensional shear stress magnitude in a single bend. It was observed that, as interaction length is increased, there was a percentage change decays, but after about 30d exit length the change is saturated to a value of about 10% with a maximum difference observed of 27%.

Technical effects of the invention include identification of the locations and magnitude of local shear stress maxima for a piping network. Such information may enable piping network operators to more effectively place corrosion monitors. In the case of prolonged exposure to corrosive fluids, areas of a piping network that exhibit higher shear stress may be more likely to fail, or may fail more quickly that areas experiencing lower magnitudes of shear stress. Because corrosion monitoring is typically performed at spot locations along a network, the disclosed embodiments may enable more effective selection of the monitoring locations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:

using a processor, wherein the processor comprises instructions for:

receiving information about a piping network for fluids, wherein the information comprises operating condition parameters and fluid properties for at least two piping components in the piping network, wherein the at least two piping components are characterized by geometric parameters;

determining a location of a local shear stress maximum caused by flow within the piping network for each of the at least two piping components based on the information; and determining a placement of a corrosion monitoring device on the at least two piping components based on the location of the respective local shear stress maximum, wherein each piping component is associated with one or more local shear stress maxima.

2. The method of claim 1, comprising determining a magnitude of the local shear stress maximum for each of the at least two piping components.

3. The method of claim 1, wherein determining the location of the local shear stress maximum for each of the at least two piping components comprises identifying a region that comprises less than 10% of the span of each respective piping component.

4. The method of claim 1, wherein receiving information about the piping network for fluids comprises receiving information about a relative orientation of the at least two piping components.

5. A non-transitory computer readable medium, comprising instructions stored therein for:

receiving information about a piping network for fluids, wherein the information comprises geometrical parameters, operating condition parameters, and fluid properties for at least two piping components in the piping network wherein the at least two piping components are characterized by geometric parameters;

determining a location of a local shear stress maximum caused by flow within the piping network for each of the at least two piping components based on the information; and determining a placement of a corrosion monitoring device on the at least two piping components based on the location of the respective local shear stress maximum, wherein each piping component is associated with one or more local shear stress maxima.

6. The computer readable medium of claim 5, comprising code for determining a magnitude of the local shear stress maximum for each of the at least two piping components.

7. The computer readable medium of claim 5, comprising code for ranking a plurality of local shear stress maxima.

8. The computer readable medium of claim 5, wherein the code for determining the location of the local shear stress maximum comprises code for identifying a region that comprises less than 10% of the span of each respective piping component.

9. The computer readable medium of claim 5, wherein the code for receiving information about the piping network for fluids comprises code for receiving information about a relative orientation of the at least two piping components.

10. A corrosion monitoring system comprising:

a processor, wherein the processor is configured to receive information about a piping network for fluids, wherein the information comprises geometrical parameters, operating condition parameters, and fluid properties for at least two piping components in the piping network, and wherein the processor is configured to determine a location of a local shear stress maximum caused by flow within the piping network for each of the at least two piping components based on the information and wherein the processor is configured to determine a placement of a corrosion monitoring device on the at least two piping components based on the location of the respective local shear stress maximum, wherein each piping component is associated with one or more local shear stress maxima.

11. The corrosion monitoring system of claim 10, wherein the processor is configured to determine a magnitude of the local shear stress maximum for each of the at least two piping components.

12. The corrosion monitoring system of claim 10, wherein the processor is configured to rank a plurality of local shear stress maxima.

13. The corrosion monitoring system of claim 10, wherein the processor is configured to identify the location of the local shear stress maximum that comprises less than 10% of the span of each respective piping component.

14. The corrosion monitoring system of claim 10, wherein the processor is configured to receive information about a relative orientation of the at least two piping components.

15. The corrosion monitoring system of claim 10, comprising a corrosion sensor.

* * * * *